United States Patent
Pickett et al.

(10) Patent No.: US 7,024,537 B2
(45) Date of Patent: Apr. 4, 2006

(54) DATA SPECULATION BASED ON ADDRESSING PATTERNS IDENTIFYING DUAL-PURPOSE REGISTER

(75) Inventors: James K. Pickett, Austin, TX (US); Benjamin Thomas Sander, Austin, TX (US); Kevin Michael Lepak, Madison, WI (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 589 days.

(21) Appl. No.: 10/348,144

(22) Filed: Jan. 21, 2003

(65) Prior Publication Data

US 2004/0143721 A1 Jul. 22, 2004

(51) Int. Cl.
*G06F 12/10* (2006.01)

(52) U.S. Cl. .................. 711/217; 711/132; 711/204; 711/213; 712/225; 712/202

(58) Field of Classification Search ............... 711/217, 711/132, 204, 213
See application file for complete search history.

(56) References Cited

U.S. PATENT DOCUMENTS

| | | | |
|---|---|---|---|
| 5,127,103 A * | 6/1992 | Hill et al. ............. | 714/45 |
| 5,428,807 A | 6/1995 | McKeen et al. | |
| 5,584,009 A | 12/1996 | Garibay et al. | |
| 5,778,219 A | 7/1998 | Amerson et al. | |
| 5,781,752 A | 7/1998 | Moshovos et al. | |
| 5,845,103 A | 12/1998 | Sadani et al. | |
| 5,892,936 A | 4/1999 | Tran et al. | |
| 6,021,485 A | 2/2000 | Feiste et al. | |
| 6,065,103 A | 5/2000 | Tran et al. | |
| 6,108,770 A | 8/2000 | Chrysos et al. | |
| 6,112,296 A * | 8/2000 | Witt et al. ............. | 712/222 |
| 6,175,910 B1 | 1/2001 | Pauporte et al. | |
| 6,202,204 B1 | 3/2001 | Wu et al. | |
| 6,237,082 B1 | 5/2001 | Witt et al. | |
| 6,249,862 B1 | 6/2001 | Chinnakonda et al. | |

(Continued)

FOREIGN PATENT DOCUMENTS

WO 01/35212 5/2001

(Continued)

OTHER PUBLICATIONS

International Search Report for PCT/US2004/000477, mailed Jun. 9, 2004, 7 pages.

(Continued)

*Primary Examiner*—Eddie Chan
*Assistant Examiner*—Brian P. Johnson
(74) *Attorney, Agent, or Firm*—Robert C. Kowert; Meyertons, Hood, Kivlin, Kowert & Goetzel, P.C.

(57) ABSTRACT

A system may include a memory file and an execution core. The memory file may include an entry configured to store an addressing pattern and a tag. If an addressing pattern of a memory operation matches the addressing pattern stored in the entry, the memory file may be configured to link a data value identified by the tag to a speculative result of the memory operation. The addressing pattern of the memory operation includes an identifier of a logical register, and the memory file may be configured to predict whether the logical register is being specified as a general purpose register or a stack frame pointer register in order to determine whether the addressing pattern of the memory operation matches the addressing pattern stored in the entry. The execution core may be configured to access the speculative result when executing another operation that is dependent on the memory operation.

48 Claims, 13 Drawing Sheets

U.S. PATENT DOCUMENTS

| | | | |
|---|---|---|---|
| 6,295,574 | B1 | 9/2001 | MacDonald |
| 6,349,382 | B1 | 2/2002 | Feiste et al. |
| 6,415,380 | B1 | 7/2002 | Sato |
| 6,438,673 | B1 | 8/2002 | Jourdan et al. |
| 6,463,580 | B1 | 10/2002 | Wilkerson |
| 6,549,990 | B1 | 4/2003 | Hughes et al. |
| 6,643,767 | B1 | 11/2003 | Sato |
| 6,658,554 | B1 | 12/2003 | Moshovos et al. |
| 2002/0023204 | A1 | 2/2002 | Barowski et al. |

FOREIGN PATENT DOCUMENTS

| | | |
|---|---|---|
| WO | 03/093982 | 11/2003 |

OTHER PUBLICATIONS

Kim, et al., "Implementing Optimizations at Decode Time," Dept. of Electrical and Computer Engineering, Univ. of Wisconsin-Madison, 11 pages.

Moshovos, et al., "Streamlining Inter-operations Memory Communication via Data Dependence Prediction," IEEE, 1997, 11 pages.

Reinman, et al., "Classifying Load and Store Instructions for Memory Renaming," Proceedings of the International Conference on Supercomputing, Jun. 1999, 10 pages.

Bekerman, et al., "Early Load Address Resolution Via Register Tracking," Intel Corporation, Proceedings 27th International Symposium Computer Architecture, Jun. 2000, pp. 306-316.

Jourdan, et al., "A Novel Renaming Scheme to Exploit Value Temporal Locality through Physical Register Reuse and Unification," Intel Corporation, IEEE, 1998, 10 pages.

Moshovos, et al., "Memory Dependence Prediction in Multimedia Applications," 18 pages.

Thomas, et al., "Using Dataflow Context for Accurate Value Prediction," 10 pages.

Onder, et al., "Load and Store Reuse Using Register File Contents," ACM 15th International Conference on Supercomputing, pp. 289-302, Jun. 2001.

Petric, et al., "Three Extensions to Register Integration," IEEE, 35th Annual IEEE/ACM International Symposium on Microarchitecture (MICRO-35), Nov. 18-22, 2002, 12 pages.

Lee, et al., "Stack Value File: Custom Microarchitecture for the Stack," IEEE, Seventh International Symposium on High-Performance Computer Architecture (HPCA '01), Jan. 20-24, 2001, 11 pages.

Chung, et al., "Direct Load: Dependence-Linked Dataflow Resolution of Load Address and Cache Coordinate," 35th Annual International Symposium on Microarchitecture (MICRO'01), Dec. 1-5, 2001, IEEE, pp. 76-87.

Ma, et al., "Symbolic Cache: Fast Memory Access Based on Program Syntax," International Conference on Computer Design: VLSI in Computers & Processors (ICDD'01), Sep. 23-26, 2001, IEEE, pp. 54-61.

* cited by examiner

Calling Routine:
    PUSH EBX
    PUSH EDI
    PUSH ESI
    CALL SUB1
SUB1:
    PUSH EBP
    MOV EBP, ESP
    SUB ESP, 4
    MOV EAX, [EBP + 8]
    MOV EBX, [EBP + 12]
    MOV [EBP - 4], EBX
    ADD EAX, [EBP - 4]
    MOV ESP, EBP
    POP EBP
FIG. 2C
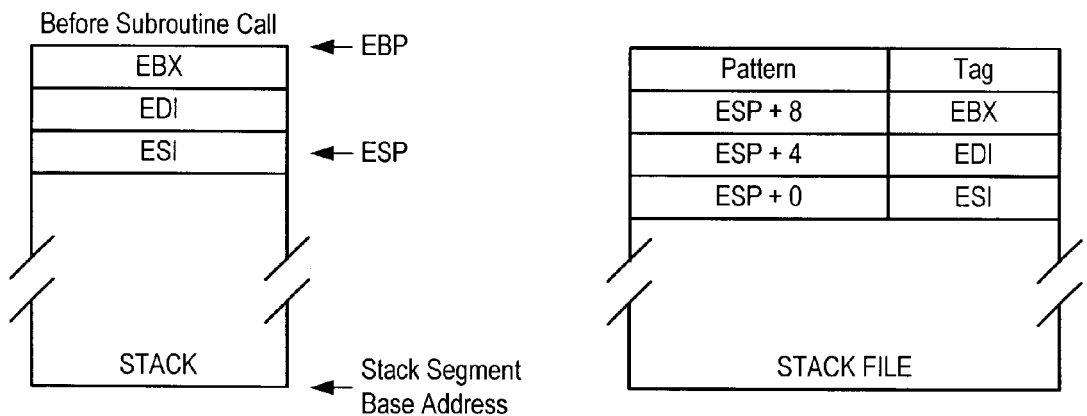
FIG. 2D
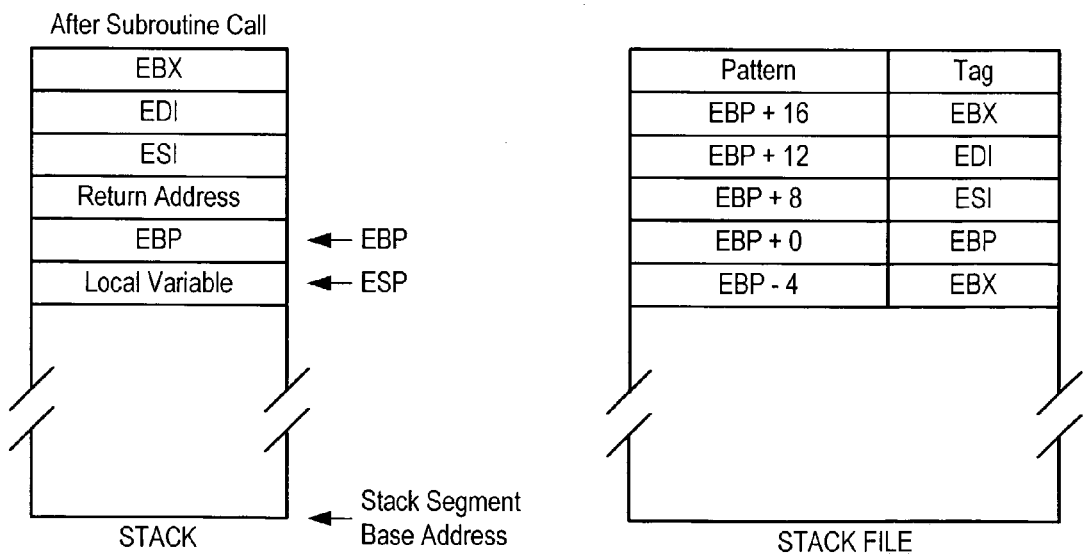
FIG. 2E

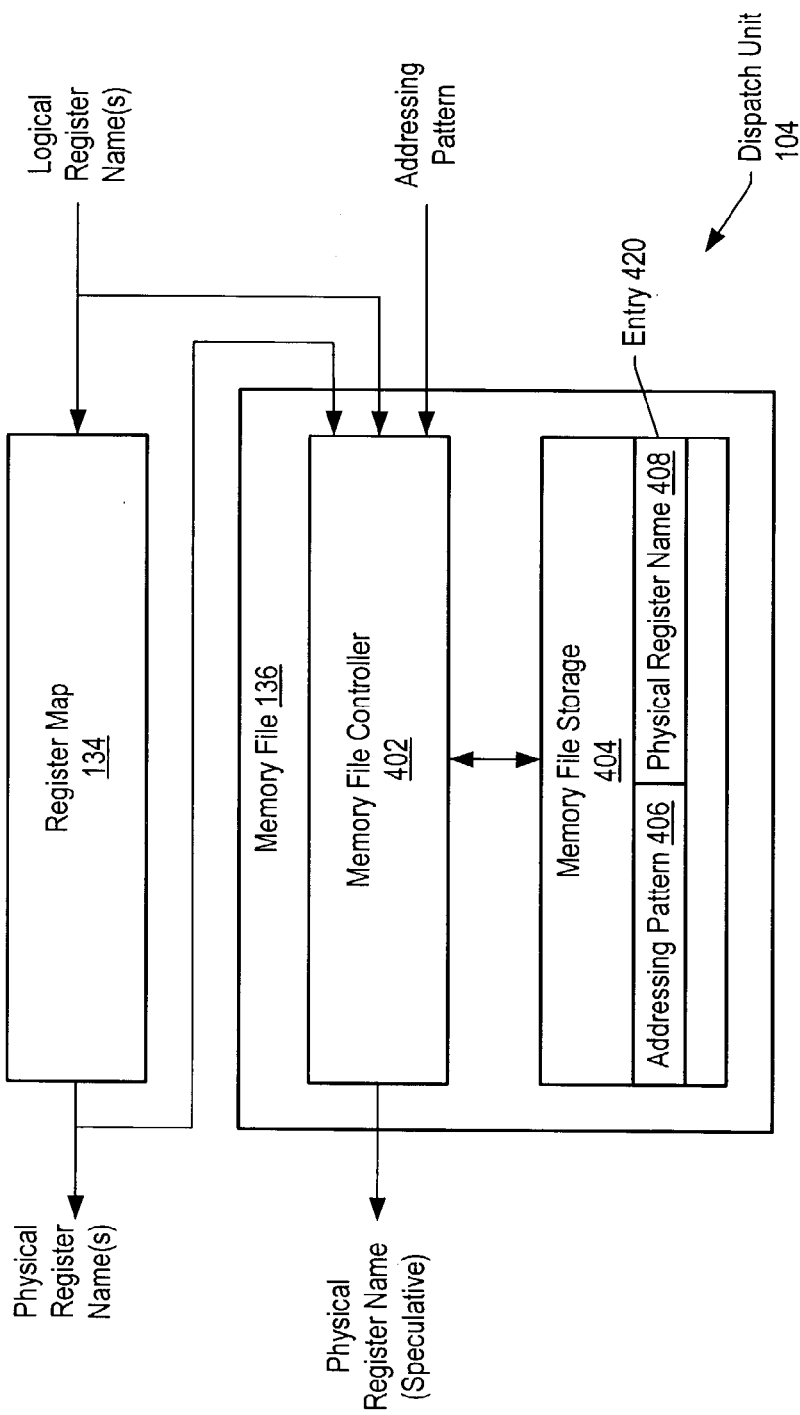
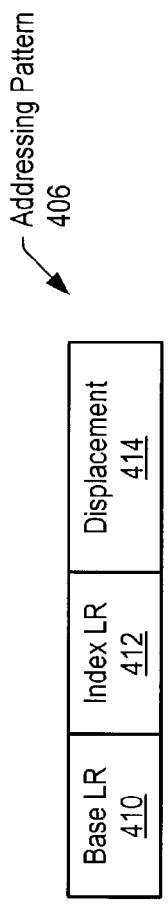
FIG. 4A
FIG. 4B

DATA SPECULATION BASED ON ADDRESSING PATTERNS IDENTIFYING DUAL-PURPOSE REGISTER

BACKGROUND OF THE INVENTION

1. Field of the Invention

This invention is related to the field of microprocessors, and more particularly, to performing data-speculative execution in a microprocessor.

2. Description of the Related Art

Superscalar microprocessors achieve high performance by executing multiple instructions concurrently and by using the shortest possible clock cycle consistent with their design. However, data and control flow dependencies between instructions may limit how many instructions may be issued at any given time. As a result, some microprocessors support speculative execution in order to achieve additional performance gains.

One type of speculation is control flow speculation. Control flow speculation predicts the direction in which program control will proceed. For example, branch prediction may be used to predict whether a branch will be taken. Many types of branch prediction are available, ranging from methods that simply make the same prediction each time to those that maintain sophisticated histories of the previous branches in the program in order to make a history-based prediction. Branch prediction may be facilitated through hardware optimizations, compiler optimizations, or both. Based on the prediction provided by the branch prediction mechanism, instructions may be speculatively fetched and executed. When the branch instruction is finally evaluated, the branch prediction can be verified. If the prediction was incorrect, any instructions that were speculatively executed based on the incorrect predication may be quashed.

Another type of speculation that has been proposed is data speculation. For example, value prediction, which predicts the value of data items, may involve observing patterns in data and basing the prediction on those patterns (e.g., an index counter variable's value may be predicted by observing how prior values of that variable are incremented or decremented). Address prediction involves predicting the location of data. Yet another type of data speculation is called memory system optimism. In multiprocessor systems, memory system optimism occurs when a processor speculatively executes an instruction using data from that processor's local cache before coherency checking is complete. Similarly, another type of data speculation may allow a load to speculatively execute before a store that has an uncomputed address at the time the load executes, even though the store may store data to the same address that the load accesses. In all of these types of data speculation, the underlying conditions are eventually evaluated, allowing the speculation to be verified or undone. If the speculation ends up being incorrect, the instructions that executed using the speculative data may be re-executed (e.g., with updated and/or non-speculative data).

Since speculation allows execution to proceed without waiting for dependency checking to complete, significant performance gains may be achieved if the performance gained from correct speculations exceeds the performance lost to incorrect speculations. Accordingly, it is desirable to be able to perform data speculation in a microprocessor and to provide an efficient recovery mechanism for misspeculations.

Many processors require a portion of main memory called a "stack" be available during operation. Early x86 microprocessors used the stack to save state information while handling exceptions and interrupts. Memory locations within the stack portion of main memory may be accessed using an stack segment and stack pointer (SS:SP or SS:ESP) register pair. The 16-bit SS (stack segment) register defines the base address of the portion of main memory containing the stack (i.e., the address of the "bottom" of the stack). The 16-bit SP (stack pointer) register may provide an offset from the base address of the current "top" of the stack. More modern x86 processors have a 32-bit ESP (extended stack pointer) register.

The stack is implemented as a last-in, first-out (LIFO) storage mechanism. The top of the stack is the storage location containing the data most recently stored within the stack. Data is "pushed" onto the stack (i.e. stored at the top of the stack) and "popped" from the stack (i.e. removed from the top of the stack). As data is pushed onto the stack, the ESP register is typically decremented. In other words, the x86 stack typically grows in a downward direction from the base address. When the stack is popped, the data removed is the data most recently pushed onto the stack.

The x86 architecture includes a relatively small number of registers which may be used to store data manipulated during software program execution. As a result, data used during software program execution is often stored within the stack. Accessibility of data stored within the stack is thus particularly important in achieving high microprocessor performance. On the other hand, the stack is a portion of the main memory, and accesses to the main memory are relatively slow. It would therefore be desirable to speed access to the stack portion of main memory.

SUMMARY

Various embodiments of methods and systems for linking speculative results of load operations to register values may be implemented by matching addressing patterns included in different operations. In one embodiment, a system may include a memory file and an execution core. The memory file may include an entry configured to store an addressing pattern and a tag. If an addressing pattern of a memory operation (i.e., an operation that loads and/or stores a value at an address in memory) matches the addressing pattern stored in the entry, the memory file may be configured to link a data value identified by the tag to a speculative result of the memory operation. The addressing pattern of the memory operation includes an identifier of a logical register, and the memory file may be configured to predict whether the logical register is being specified as a general purpose register or a stack frame pointer register in order to determine whether the addressing pattern of the memory operation matches the addressing pattern stored in the entry. The execution core may be configured to access the speculative result when executing another operation that is dependent on the memory operation.

In some embodiments, if the memory file predicts that the logical register included in the addressing pattern of the memory operation is being used as the stack frame pointer register, the memory file may determine that the addressing pattern of the memory operation does not match the addressing pattern stored in the entry. In contrast, if the memory file predicts that the logical register is being used as a general purpose register, the memory file may determine that the addressing pattern of the load operation matches the addressing pattern stored in the entry if the addressing pattern of the memory operation equals the addressing pattern stored in the entry. The memory file may also be configured to not allocate a new entry to store the addressing pattern of the memory operation if the memory file predicts that the logical register included in the addressing pattern of the memory operation is being used as the stack frame pointer register. However, if the memory file predicts that the logical register is being used as a general purpose register, the memory file may be configured to allocate a new entry to store the addressing pattern of the memory operation, if the addressing pattern of the memory operation does not equal the addressing pattern stored in the entry.

In many embodiments, the memory file may include several entries. The memory file may be configured to determine that the addressing pattern of the memory operation does not match the addressing patterns stored in any of the entries if the memory file predicts that the logical register is being used as the stack file pointer register.

In one embodiment, the memory file may be configured to predict that the logical register is being used as the stack frame pointer in response to detection of a call or enter instruction. The memory file may also be configured to predict that the logical register is being used as the general purpose register in response to detection of a return or leave instruction.

In other embodiments, the memory file may be configured to predict how the logical register is being used by tracking a current call depth. The memory file may be configured to increase the current call depth in response to detecting a call instruction and to decrease the current call depth in response to detecting a return instruction. All values other than an initial value may indicate the current subroutine call depth due to encountering one or more subroutine calls. The entry may store a call depth value equal to a value of the current call depth when the entry was allocated. If a value of the current call depth when the memory operation is handled is not equal to the call depth value stored in the entry, the memory file may be configured to determine that the addressing pattern of the memory operation does not match the addressing pattern stored in the entry. If the value of the current call depth when the memory operation is handled is equal to the call depth value stored in the entry, the memory file may be configured to determine that the addressing pattern of the memory operation matches the addressing pattern stored in the entry if the addressing pattern of the memory operation equals the addressing pattern stored in the entry. If the value of the current call depth when the memory operation is handled is not equal to the call depth value stored in the entry, the memory file may be configured to allocate a new entry to store the addressing pattern of the memory operation and to store the value of the current call depth when the memory operation is handled in the new entry. If the addressing pattern stored in the entry identifies the logical register and if a value of the current call depth when the operation is handled is equal to the call depth value stored in the entry, the memory file may be configured to invalidate the entry in response to dispatch of an operation that, when executed, modifies a value of the logical register. However, the memory file may not invalidate the entry in response to dispatch of the operation if the value of the current call depth when the operation is handled is not equal to the call depth value stored in the entry.

In some embodiments, the memory file may track both stack-relative addressing patterns and non-stack-relative addressing patterns. For example, in one embodiment, the memory file may include an entry that stores a stack-relative addressing pattern. The memory file may be configured to use a mechanism to compensate for adjustments to the stack pointer when determining whether an addressing pattern of an operation matches the stack-relative addressing pattern stored in the entry. For example, the memory file may be configured to compensate for adjustments to the stack pointer by modifying a displacement stored in the entry in response to dispatch of an operation that, when executed, modifies the value of the stack pointer. Alternatively, the memory file may be configured to compensate for adjustments to the stack pointer by modifying an addressing pattern adjustment value and applying the addressing pattern adjustment value to an addressing pattern of a new operation prior to comparing the addressing pattern of the new operation to the stack-relative addressing pattern stored in the entry.

In some embodiments, the system may include both a stack file and a memory file. If the addressing pattern of an operation does not match an addressing pattern stored in one of the stack file entries and if the addressing pattern of the operation includes the identifier of the logical register, the stack file may be configured to allocate an entry to store the addressing pattern of the operation. The memory file may also allocate an entry in response to the same operation. In other embodiments, the memory file may selectively allocate entries to the operation dependent on predicting whether the logical register is being specified as a general purpose register or a stack frame pointer register. The memory file may be configured to never allocate an entry in the memory file to any operation whose addressing pattern includes an identifier of a stack pointer register, while the stack file may always allocate entries to such operations. In one embodiment, the stack file may maintain a stack pointer addressing pattern adjustment value and a stack frame pointer addressing pointer adjustment value. The memory file may be configured to predict whether the logical register is being specified as a general purpose register or a stack frame pointer register dependent on whether the stack frame pointer addressing pointer adjustment value is valid.

One embodiment of a method may involve: predicting whether a logical register identified in an addressing pattern of a memory operation is being used as a general purpose register or as a stack frame pointer register; dependent on the prediction, determining whether an addressing pattern of the memory operation matches an addressing pattern of an earlier operation; if the addressing pattern of the memory operation matches an addressing pattern of an earlier operation, linking a data value identified by a tag of an operand for the earlier operation to a speculative result of the memory operation; and executing an operation having an operand source dependent on a result of the memory operation by accessing the data value identified by the tag.

BRIEF DESCRIPTION OF THE DRAWINGS

A better understanding of the present invention can be obtained when the following detailed description is considered in conjunction with the following drawings, in which:

FIGS. 2C–2E illustrate exemplary program instructions and exemplary stack and stack file contents that may be generated in one embodiment.

FIG. 4A shows a dispatch unit, according to one embodiment.

FIG. 4B illustrates an exemplary address pattern that may be used in some embodiments.

Figure 1:
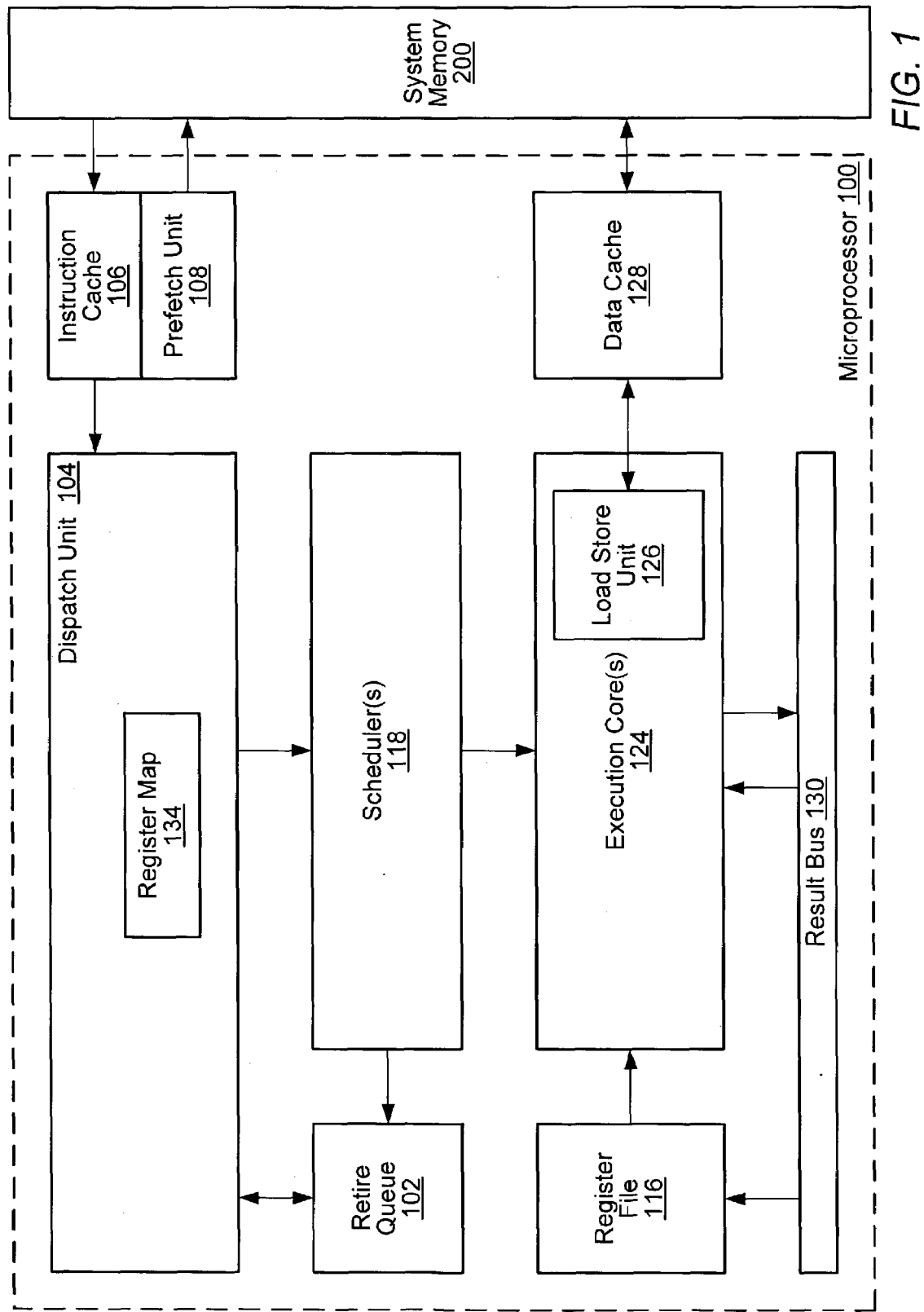
FIG. 1 shows a block diagram of a microprocessor, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram of one embodiment of a microprocessor 100. Microprocessor 100 is configured to execute instructions stored in a system memory 200. Many of these instructions operate on data stored in system memory 200. Note that system memory 200 may be physically distributed throughout a computer system and may be accessed by one or more microprocessors 100.

Microprocessor 100 may include an instruction cache 106 and a data cache 128. Microprocessor 100 may include a prefetch unit 108 coupled to the instruction cache 106. A dispatch unit 104 may be configured to receive instructions from instruction cache 106 and to dispatch operations to scheduler(s) 118. One or more schedulers 118 may be coupled to receive dispatched operations from dispatch unit 104 and to issue operations to one or more execution cores 124. Execution core(s) 124 may include a load/store unit 126 configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue may be configured to determine when each issued operation may be retired. In one embodiment, the microprocessor 100 may be designed to be compatible with the x86 architecture. Note that microprocessor 100 may also include many other components. For example, microprocessor 100 may include a branch prediction unit (not shown).

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped).

Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms.

Dispatch unit 104 may output signals including bit-encoded operations executable by the execution core(s) 124 as well as operand address information, immediate data, and/or displacement data. In some embodiments, dispatch unit 104 may include decoding circuitry (not shown) for decoding certain instructions into operations executable within execution core(s) 124. Simple instructions may correspond to a single operation. In some embodiments, more complex instructions may correspond to multiple operations. If an operation involves the update of a register, a register location within register file 116 may be reserved (e.g., upon decode of that operation) to store speculative register states (in an alternative embodiment, a reorder buffer may be used to store one or more speculative register states for each register). A register map 134 may translate logical register names of source and destination operands to physical register names in order to facilitate register renaming. Register map 134 may track which registers within register file 116 are currently allocated and unallocated.

The microprocessor 100 of FIG. 1 supports out of order execution. A retire queue 102 may keep track of the original program sequence for register read and write operations, allow for speculative instruction execution and branch misprediction recovery, and facilitate precise exceptions. In some embodiments, retire queue 102 may also support register renaming by providing data value storage for speculative register states. In many embodiments, retire queue 102 may function similarly to a reorder buffer. However, unlike a typical reorder buffer, retire queue 102 may not provide any data value storage. In some embodiments, retire queue 102 may be implemented in a first-in-first-out configuration in which operations move to the "bottom" of the buffer as they are validated, thus making room for new entries at the "top" of the queue. As operations are retired, retire queue 102 may deallocate registers in register file 116 that are no longer needed to store speculative register states and provide signals to register map 134 indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

If a required operand of a particular operation is a register location, register address information may be routed to register map 134 (or a reorder buffer). For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that is determined to modify the contents of one of the logical registers. Therefore, at various points during execution of a particular program, register file 116 (or, in alternative embodiments, a reorder buffer) may have one or more registers that contain the speculatively executed contents of a given logical register.

Register map 134 may assign a physical register to a particular logical register specified as a destination operand for an operation. Dispatch unit 104 may determine that register file 116 has one or more previously allocated physical registers assigned to a logical register specified as a source operand in a given operation. The register map 134 may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in register file 118) through load/store unit 222. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The bit-encoded operations and immediate data provided at the outputs of dispatch unit 104 may be routed to one or more schedulers 118. Note that as used herein, a scheduler is a device that detects when operations are ready for execution and issues ready operations to one or more execution units. For example, a reservation station is a scheduler. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by execution core(s) 124 (from register file 116 or result bus 130). In some embodiments, each scheduler 118 may be associated with a dedicated execution core 124. In other embodiments, a single scheduler 118 may issue operations to more than one of the execution core(s) 124.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence. Operations that involve data speculation may remain in scheduler(s) 118 until they become non-speculative so that they may be reissued if the data speculation is incorrect.

In one embodiment, each of the execution core(s) 124 may include components configured to perform integer arithmetic operations of addition and subtraction, as well as shifts, rotates, logical operations, and branch operations. A floating point unit may also be included to accommodate floating point operations. One or more of the execution core(s) 124 may be configured to perform address generation for load and store memory operations to be performed by load/store unit 126.

The execution core(s) 124 may also provide information regarding the execution of conditional branch instructions to a branch prediction unit so that if the branch was mispredicted, the branch prediction unit may flush instructions subsequent to the mispredicted branch that have entered the instruction processing pipeline and redirect prefetch unit 106. The redirected prefetch unit 106 may then begin fetching the correct set of instructions from instruction cache 106 or system memory 200. In such situations, the results of instructions in the original program sequence that occurred after the mispredicted branch instruction may be discarded, including those which were speculatively executed and temporarily stored in register file 116. Results produced by components within execution core(s) 124 may be output on the result bus 130 to the register file 116 if a register value is being updated. If the contents of a memory location are being changed, the results produced within execution core(s) 124 may be provided to the load/store unit 126.

Load/store unit 126 provides an interface between execution core(s) 124 and data cache 128. In one embodiment, load/store unit 126 may be configured with a load/store buffer with several storage locations for data and address information for pending loads or stores. The load/store unit 126 may also perform dependency checking for load instructions against pending store instructions to ensure that data coherency is maintained.

Data cache 128 is a cache memory provided to temporarily store data being transferred between load/store unit 126 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

Stack Area

One logical register (e.g., a stack segment register such as SS in x86 applications) supported by microprocessor 100 may identify the base address of a stack area in memory 200. Another logical register (e.g., ESP) may be used as a stack pointer register to identify the current top of the stack area. The address of the current top of the stack may be formed by combining the base address of the stack area and an offset within the stack specified in the stack pointer register. This address may be used to push values onto the stack and to pop values from the stack.

Certain instructions may cause the contents of one or more registers to be "pushed" onto the stack. For example, during a subroutine call, the current contents of one or more of the logical registers may be pushed onto the stack area of memory. Push instructions modify the stack pointer and then store a data value to the top of the stack now pointed to by the modified stack pointer. For example, in x86 embodiments, a push instruction may decrement the stack pointer register value by an amount corresponding to the size of the operand to be pushed onto the stack and then use the modified value to store the operand value onto the top of the stack. Similarly, pop instructions load an operand from the top of the stack into a register or memory location and then modify the stack pointer so that it points to the new top of the stack, effectively removing the popped operand from the stack. When a subroutine completes, values saved at the beginning of the subroutine may be popped off the stack and restored to the appropriate locations within register file 116.

A subroutine may be a procedure or an interrupt- or exception-handling routine. Some register values (e.g., a code segment register value and/or an instruction pointer register value indicating the return address) may automatically be saved when a subroutine call instruction is executed. Other register values may be saved in response to specific store instructions included within the calling subroutine or at the beginning of a subroutine (e.g., the value in EAX is saved in response to PUSH EAX or MOV [EBP-2], EAX).

Return instructions may cause certain register values to be automatically popped from the stack. Other register values may be popped from the stack in response to pop or store instructions included in a subroutine. In some embodiments, a microprocessor may support instructions that, when executed, push and/or pop all of the logical register values on and/or off the stack. Note that interrupts and exceptions may also cause register values to be pushed onto the stack.

Each subroutine may have an associated stack frame within the stack area in which local variables and parameters passed to that subroutine are stored. A base pointer register (e.g., EBP) may be used as a stack frame pointer that points to the base address of the current subroutine's stack frame. Instructions within a subroutine may use the stack frame pointer in addressing patterns used to access parameters passed to the subroutine and local values used within the subroutine. In one embodiment, positive offsets to the stack frame pointer may be used to access parameters while negative offsets to the stack frame pointer may be used to access local variables.

Thus, stack-relative addressing patterns may be specified using either the stack pointer register or the stack frame pointer register. Parameter values pushed onto the stack by a calling routing may be addressed using the stack pointer. Parameter values access within a called subroutine may be addressed using the stack frame pointer. When a subroutine is called, the current value of the stack frame pointer register (used in the calling routine) may be saved to the top of the stack. Then, the subroutine may copy the current value of the stack pointer register into the stack frame pointer register, establishing the frame pointer to the subroutine's stack frame. When the subroutine completes, the calling routine's frame pointer value may be restored to the frame pointer register.

Data Speculation Based on Stack-Relative Addressing Patterns

Microprocessor 100 may be configured to perform data speculative execution using data values that are predicted using stack-relative addressing patterns (i.e., addressing patterns that access a stack area of memory) of various operations. For example, when an operation is dispatched to scheduler 118, speculative values for one or more of the operation's operands may be identified by comparing the addressing patterns of the operation's operands with addressing patterns currently stored in a stack file. In some embodiments, the scheduler 118 may issue the operation for execution using the speculative values. If the speculation is later determined to be incorrect, the operation may be reissued using non-speculative values.

Figure 2A:
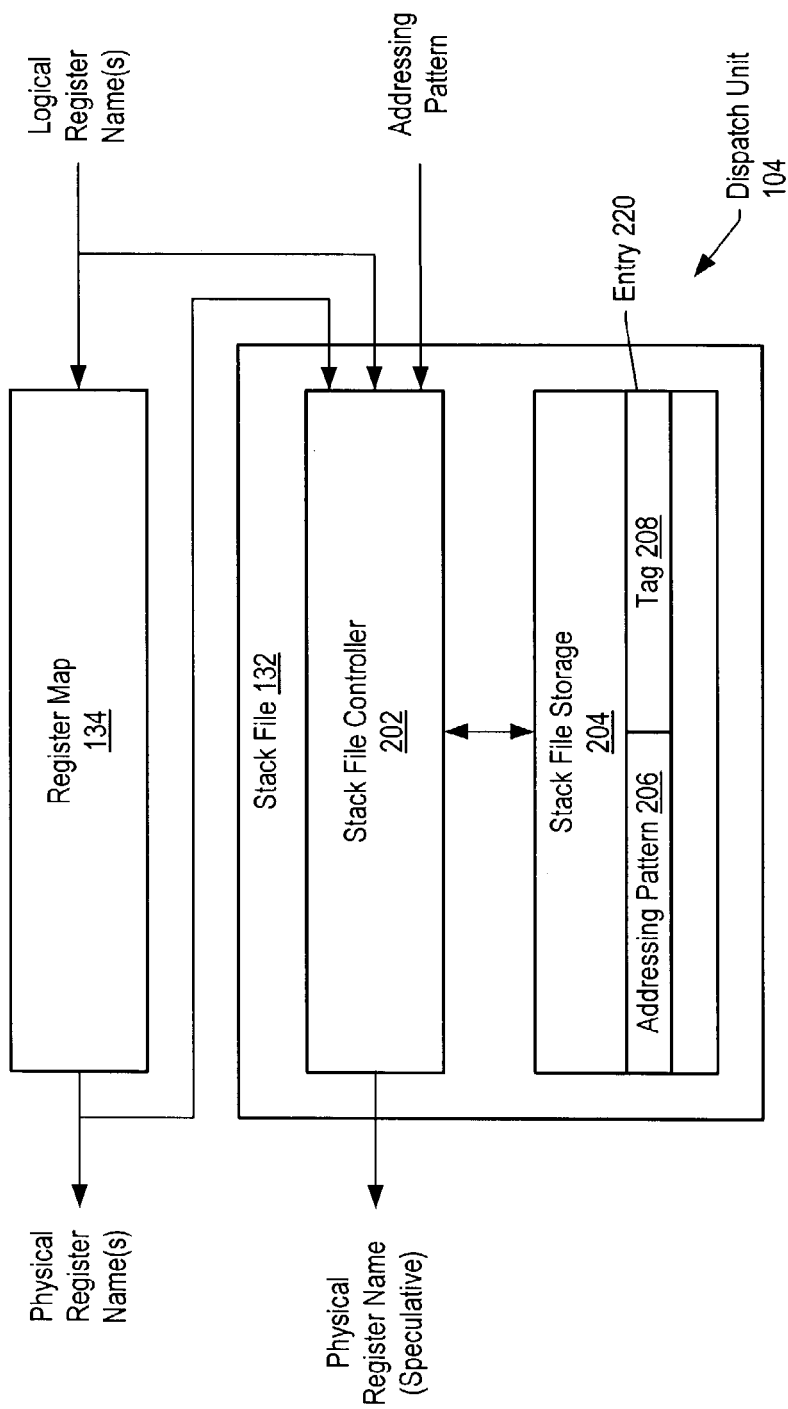
FIG. 2A is a block diagram of a dispatch unit, according to one embodiment.

FIG. 2A shows one embodiment of a dispatch unit 104 that may be configured to identify speculative operand values based on operands' addressing patterns. In this embodiment, dispatch unit 104 includes a register map 134 and a stack file 132. As mentioned above, register map 134 may be configured to provide register renaming. Register map 134 may receive logical register names for each source and destination operand of each instruction (or operation) and output the physical register names of the physical registers most recently assigned to those logical registers. Register map 134 may assign physical registers to store the results of operations. Stack file 132 includes a stack file controller 202 and stack file storage 204. Stack file storage 204 may be implemented from several registers, latches, counters, adders/subtractors, flip-flops, or other clocked storage in some embodiments. In alternative embodiments, stack file storage 204 may include one or more RAM (Random Access Memory) cells.

Figure 2B:
FIG. 2B illustrates an exemplary address pattern that may be used in one embodiment.

Stack file storage 204 includes one or more entries 220. Each entry 220 may include an addressing pattern 206 and a tag 208 associated with that entry's addressing pattern 206. Each tag may identify a data value by indicating where that data value will be stored (e.g., within a reorder buffer or within a register file 116) when it is generated. For example, as shown in the illustrated embodiment, each tag may identify the physical register allocated to store that data value, as indicated by register map 134. Each addressing pattern may include all or some of the information used to identify a particular stack location. For example, looking quickly at FIG. 2B, an exemplary addressing pattern 206 is shown. In this embodiment, the addressing pattern 206 includes a logical register name 210 and a displacement 214. The logical register name 210 is the name of a logical register used to access data in the stack (e.g., a stack pointer register or stack frame pointer register). The displacement may indicate a value to be added to or subtracted from the address currently stored in the logical register. Some addressing patterns 206 may also include other information, such as a segment logical register name or index register name.

An entry 220 within the stack file storage 204 may be allocated in response to instructions or operations whose addressing patterns specify locations within a stack area of memory. For example, an entry may be allocated in response to a store operation that stores a value (e.g., from a physical register) to a memory location within the stack area. A push instruction is an example of an instruction that includes a store operation. A move instruction that specifies a memory location as the destination is another example of an instruction that includes a store operation. The stack file controller 202 may detect store operations that store data values to memory locations within the stack area in memory (e.g., based on the operations' opcodes and/or addressing patterns). If the addressing pattern of a detected store operation is not already included in a stack file entry 220, the stack file controller 202 may allocate a new entry 220 to store that addressing pattern. The stack file controller may also store the tag identifying the data value to be stored by the store operation. For example, if the stack file controller 202 detects an instruction PUSH EAX, the stack file controller may store a tag identifying the physical register currently assigned to logical register EAX in the stack file entry 220 allocated in response to the PUSH instruction. The stack file controller may store ESP+0 (where +0 is the displacement in bytes) as the addressing pattern for the PUSH instruction. If there are no free entries to allocate within stack file storage 204, stack file controller 202 may select an entry to overwrite using a replacement scheme such as LRU (Least Recently Used), FIFO (First In, First Out), random replacement, etc.

If an operation's addressing pattern is already included in a stack file entry, the stack file controller 202 may overwrite the tag stored in the matching entry with the tag specified in the operation. For example, if a store operation's addressing pattern hits in the stack file storage 204, the stack file controller 202 may overwrite the tag stored in the matching entry 220 with the tag of the store operation's source operand.

Stack file controller 202 may compare the addressing patterns specified in undispatched operations to those stored within entries in stack file storage 204. If an operation's addressing pattern matches the addressing pattern stored in an entry in stack file storage 204 (e.g., the operation's stack-relative displacement hits in the stack file storage 204), the stack file controller 202 may use or modify (as described above) the entry containing the matching addressing pattern. If an operation that loads a value from the stack into a register is being handled, the stack file controller 202 may output the tag (e.g., the physical register name) stored in the matching entry 220 within stack file storage 204. An operation that loads a value from the stack into a register is referred to herein as a load operation. A pop instruction is an example of an instruction that includes a load operation. Note that in an embodiment implementing the x86 instruction set, both store operations and load operations may be performed by use of MOV instructions.

Since the stack pointer value is often modified in response to operations that store or remove data from the stack (e.g., push and pop instructions typically update the stack pointer value), the stack file controller 202 may be configured to compensate for modifications to the stack file value, either by updating entries 220 to reflect the modification or by modifying the addressing patterns input to the stack file 132 and comparing the modified addressing patterns to the addressing patterns in each stack file entry 220.

In one embodiment, the stack file controller 202 may compensate for modifications to the stack pointer value by modifying the relative displacements stored in the stack file entries 220 each time the stack pointer value is changed. For example, the stack file 132 may include subtractors and/or adders (or, alternatively, up and/or down counters) configured to update each stack file entry 220 in response to push and pop instructions. The amount of modification may depend on the operand size. For example, if a push instruction pushes a 4-byte operand onto the stack, the stack file controller 202 may add four to the displacement in each entry that specifies the stack pointer in its addressing pattern 206. Similarly, if a pop instruction removes a 2-byte operand from the stack, the stack file controller may subtract 2 from the relative displacement included in each addressing pattern 206 that specifies the stack pointer. This way, each entry's addressing pattern is correct with regard to the current position of the stack pointer.

In other embodiments, the stack file controller 202 may compensate for stack pointer value modifications by tracking one or more addressing pattern adjustment values and applying these adjustment values to addressing patterns input to the stack file 132 before comparing the input addressing patterns to the addressing patterns included in each stack file entry 220. The stack file controller may track an addressing pattern adjustment value for each logical register (e.g., ESP and EBP in some x86 embodiments) used to address data located in the stack area of memory. For example, the stack file controller may include an adder or counter to store each addressing pattern adjustment value. Each adder or counter may be associated with one of the logical registers used to address data in the stack area. Each time an operation modifying the value of an associated logical register is dispatched, an addressing pattern adjustment value may be incremented, decremented, loaded with a new value, cleared, or invalidated in order to reflect the modification. For example, each time a push instruction is dispatched, the counter associated with the stack pointer register may be decremented (e.g., count=count−4 in response to PUSH EBX).

Each time a new operation is handled by the stack file, the stack file controller 202 may apply the appropriate addressing pattern adjustment value to the new operation's addressing pattern in order to determine whether that addressing pattern hits in the stack file storage. For example, if the current ESP-relative addressing pattern adjustment value is (−12) and operation MOV EAX, [ESP+8] is received, the stack file controller 202 may add the addressing pattern adjustment value to the addressing pattern, resulting in the pattern [ESP+8−12], or [ESP−4]. If the modified addressing pattern [ESP−4] is included in a stack file entry 220, the stack file controller 202 may output the physical register identifier included in that stack file entry.

The stack file controller 202 may include one or more adders for applying the addressing pattern adjustment values to addressing patterns input to the stack file. For example, if two operations may be input to the stack file each clock cycle, the stack file controller 202 may include two adders for applying the addressing pattern adjustment values. Such an embodiment may require fewer adders and/or counters than embodiments that compensate for changes to the stack pointer by modifying the relative displacements included in each stack file entry. Additionally, many subroutines include operations that perform relatively large subtractions from the stack pointer in order to allocate large local stack frames. In embodiments that handle these operations within the stack file, relatively expensive adders and/or counters may be required for the large offsets. Reducing the number of adders and/or counters may be an important design consideration in such situations.

In some embodiments that track addressing pattern adjustment values, the addressing pattern adjustment value may also be used to adjust addressing patterns to be stored in stack file entries. For example, consider a first sequence of operations: MOV [ESP−4], EAX; MOV [ESP−8], EBX; MOV [ESP−12], ECX; ADD ESP, −12; followed by a second sequence of operations: MOV [ESP−4], ESI; MOV [ESP−8], EDI; MOV [ESP−12], EBP; ADD ESP, −12. These sequences may be generated by decoding a series of PUSH instructions into MOV and ADD operations and performing constant value propagation on the decoded operations. When the first sequence of operations is handled by the stack file controller, the stack file controller 202 may allocate or modify entries having addressing patterns [ESP−4], [ESP−8], and [ESP−12]. In response to the add operation in the first sequence, the stack file controller 202 may update the stack pointer addressing pattern adjustment value from zero to −12. When handling the second sequence of operations, the stack file controller 202 may add the addressing pattern adjustment value to each operation's address pattern prior to allocating an entry for that operation. Thus, the stack file entries allocated to the second sequence of operations may have addressing patterns [ESP−16], [ESP−20], and [ESP−24]. In response to the add operation in the second sequence, the stack file controller 202 may update the stack pointer addressing adjustment value to −24.

If the stack pointer is copied to the stack frame pointer (e.g., MOV EBP, ESP) (e.g., at the beginning of a subroutine), the stack file controller 202 may additionally compensate for this update. For example, in one embodiment, the stack file controller 202 may update each entry 220 that identifies the stack pointer register in its addressing pattern 206 to instead identify the stack frame pointer register. In one x86 embodiment, each entry that specifies ESP may be updated to specify EBP in response to the instruction MOV EBP, ESP. Similarly, in response to an operation in which the stack frame pointer is copied to the stack pointer (e.g., MOV ESP, EBP at the end of a subroutine), the stack file controller may update each entry 220 that identifies the stack frame pointer to instead identify the stack pointer. Alternatively, any entries that specify the destination register of such a copy operation as part of their addressing patterns may be invalidated. For example, an entry whose addressing pattern is EBP+4 may be invalidated in response to the copy operation MOV EBP, ESP.

In other alternative embodiments, the stack file controller 202 may compensate by setting one or more flags or other status indications in response to the occurrence of copy operations that copy the stack frame pointer to the stack pointer or vice versa. If one flag is used, the flag may be set upon detection of one type of copy (e.g., MOV EBP, ESP) and cleared upon detection of the other type of copy (e.g., MOV ESP, EBP). If the flag or status indication is set to indicate that the stack pointer has been copied to the stack frame pointer, the stack file controller 202 may equate an addressing pattern specifying the stack pointer register within stack file storage 204 with an addressing pattern specifying the stack frame pointer in an undispatched operation (or vice versa, depending on which type of copy occurred) if the displacements in each address pattern are the same. For example, if a stack file entry's addressing pattern 206 is ESP+8 and an undispatched load operation's addressing pattern is EBP+8, and if the status indication is set, the stack file controller 202 may determine that the undispatched load operation's addressing pattern matches the addressing pattern included in the entry. Accordingly, the stack file controller 202 may output the tag stored in that entry for the undispatched load operation.

In embodiments in which the stack file controller 202 tracks addressing pattern adjustment values, the stack file controller 202 may compensate for the stack pointer being copied to the stack frame pointer by copying the stack pointer addressing pattern adjustment value to a stack frame pointer addressing pattern adjustment value. For example, if operation MOV EBP, ESP is dispatched, stack file controller 202 may set the EBP addressing pattern adjustment value to equal the current ESP addressing pattern adjustment value. The stack file controller 202 may apply the EBP addressing pattern adjustment value to subsequently handled operations that specify an EBP-relative addressing pattern. While the EBP addressing pattern has a valid value, the stack file controller 202 may be configured to compare the modified EBP-relative addressing patterns in operations input to stack file 132 with ESP-relative addressing patterns in stack file entries. A modified EBP-relative addressing pattern may hit in the stack file if the stack file includes an entry 220 whose ESP-relative addressing pattern includes the same displacement as the modified EBP-relative addressing pattern. The EBP addressing pattern adjustment value may be invalidated in response to dispatch of any other operation (other than MOV EBP, ESP) that specifies EBP as a destination register in some embodiments. While the EBP addressing pattern adjustment value is invalid, stack file controller 202 may not handle operations with EBP-relative addressing patterns. In some embodiments, the stack file controller 202 may also (or alternatively) invalidate the EBP addressing pattern adjustment value in response to a return instruction.

If an operation adjusts the value of the stack pointer (e.g., ADD ESP, 12 or MOV ESP, EBP), the stack file controller 202 may update the value of the stack file pointer addressing pattern adjustment value. For example, in response to an operation that copies the stack frame pointer to the stack pointer, the stack file controller may copy the stack frame pointer adjustment value to the stack pointer adjustment value and invalidate the stack frame pointer adjustment value. In response to an operation that modifies the stack pointer value (e.g., an ADD operation), the stack file controller 202 may update the stack pointer adjustment value to reflect the modification. For example, if an operation ADD ESP, 12 is used to restore the prior stack frame, the stack file controller may modify the stack pointer addressing pattern adjustment value by adding 12 when that add operation is dispatched.

In some embodiments, the stack file 132 may handle nested subroutines by saving the adjustment values for each subroutine and, whenever a return instruction is handled, restoring the adjustment values corresponding to the previous stack frame. For example, each time a call instruction is handled, the stack file controller 202 may save the current addressing pattern adjustment values in a LIFO (Last In, First Out) structure similar to a return address stack. When a corresponding return instruction is handled, the saved adjustment values may be restored in the stack file controller 202 from that structure.

In some embodiments, addressing pattern adjustment values may include an offset value indicating an offset between the stack pointer and the stack frame pointer. Whenever an operation sets the two pointers to the same value, the offset value may be reset to zero. For example, when an operation sets the stack pointer value equal to the stack frame pointer value (e.g., MOV ESP, EBP) or vice versa, the offset value may be reset to zero. As operations modify the values of ESP and EBP, the offset value may be appropriately modified. For example, in response to a push instruction (which decreases ESP), the offset value may be increased to reflect the modification to ESP. In response to an operation that subtracts a certain value from EBP, the offset value may be decreased. The offset value may be signed in order to reflect both positive and negative offsets. As operations are handled by the stack file, the offset value (and/or the stack pointer addressing pattern adjustment value) may be used to modify the addressing patterns used to determine hits and misses in the stack file storage 204 and to modify addressing patterns before those addressing patterns are stored as new stack file entries. For example, if an operation having an EBP-relative addressing pattern is input to the stack file 132, the stack file controller 202 may apply the ESP-relative addressing pattern adjustment value and the EBP-ESP offset value to the operation's addressing pattern before comparing the addressing pattern to those stored in the stack file entries 220. The offset value may be included instead of or in addition to a stack frame pointer adjustment value in some embodiments.

If a load operation's addressing pattern hits in the stack file storage 204, the tag output by the stack file controller 202 may be used to link the value identified by the tag to a speculative result of the load operation. For example, in some embodiments, when the load operation is dispatched to scheduler(s) 118, the tag output by stack file 132 may also be provided to the scheduler(s) (e.g., as a speculative source operand tag). A scheduler 118 may issue the load operation in response to the availability (e.g., in register file 116 or on result bus 130) of the value identified by that tag. An execution core 124 may execute the load operation so that the linked value is broadcast as the speculative result of the load operation on result bus 130 (note that the value produced as the load's result may not itself be flagged or otherwise identified as a speculative value in some embodiments). In other embodiments, the value may be linked to the speculative result of the load operation by storing the tag in a speculative map, as described below.

As a result of the link, the data value identified by the tag may be forwarded as the speculative result of the load operation once the data value is available (e.g., in register file 116 or on result bus 130) in order to allow dependent operations to execute using the speculative result. In many cases, this may allow dependent operations to execute using the speculative result of the load operation sooner than they could if their execution is delayed until the non-speculative result of the load operation becomes available.

In some embodiments, the data value may be forwarded by executing the load operation so that the data value is output onto the result bus 130 as the speculative result of the load operation. For example, in one embodiment, instead of taking three cycles to execute the load operation non-speculatively (assuming the operation hit in the data cache 128), the load operation may be executed in a single cycle by outputting the data value and a tag identifying the data value as the operation's result. In other embodiments, the data value may be forwarded in a more indirect manner by providing the tag output by stack file controller 202 directly to dependent operations (operations having an operand produced by the load operation) as a speculative operand source when each dependent operation is dispatched. Means for forwarding the data value may include one or more of: a dispatch unit configured to modify the load operation to execute as a speculative register-to-register move operation or to provide the tag to a dependent operation as a speculative operand source tag, a scheduler configured to issue the modified load and/or the dependent operation dependent on the availability of the linked data value, and an execution core configured to output the linked data value as the result of the load or to execute the dependent operation using the linked data value.

The load/store unit 126 (or another means for verifying the link within microprocessor 100) may verify the link of the value stored in the physical register identified by stack file 132 to the speculative result of the load operation. If the link is incorrect, the load/store unit 126 may cause the load operation to be reissued and/or broadcast the correct result of the load operation on result bus 130. Reissuing the load may cause any dependent operations that executed using the speculative result of the load to reissue and execute using the updated, non-speculative value. Alternatively, if the link is incorrect, the processor 100 may flush the operations occurring after the mispeculation and restart execution of those operations using the correct result of the load operation. Stack file controller 202 may invalidate an entry within stack file storage 204 if the entry is used to incorrectly link values to speculative results of load operations.

As shown, stack file 132 tracks the addressing patterns in operations that access data in data cache 128 (or system memory 200). As a result, the stack file 132 allows register values stored in physical registers to be linked to values stored in particular addresses in memory.

Note that in one embodiment, the relative displacement 206 stored in stack file storage 204 may include less than all of the bits used to specify a displacement within displacement field 214. In other embodiments, the stack file controller 202 may selectively choose whether to allocate an entry in stack file storage 204 dependent on whether an entry in the stack file can store all of the addressing information for a particular operation. For example, if each entry in stack file storage 204 stores up to 16 bits of displacement information and a particular operation includes 24 bits of displacement information, the stack file controller 202 may not allocate a stack file entry for that operation.

In order to further illustrate the operation of one embodiment of stack file 132, assume that a sequence of instructions to be handled by a dispatch unit 104 includes the instructions shown in FIG. 2C. FIG. 2C shows instructions that may be included in an exemplary calling routine as well as instructions that may be included in an exemplary subroutine SUB1. Note that these instructions shown in FIG. 2C may be separated by one or more intervening instructions (not shown) in program order. FIG. 2D shows the contents of the stack and the contents of the stack file just before the subroutine call. FIG. 2E shows the contents of the stack and the contents of the stack file just after the subroutine instruction MOV [EBP–4], EBX. Note that other embodiments may handle these instructions differently (e.g., in response to the stack pointer being modified, some embodiments may update an addressing pattern adjustment value instead of updating the addressing patterns stored in the stack file).

The first instruction PUSH EBX in the calling routine may be used to save a logical register value (EBX in this example) on the stack so that it is not modified by the subroutine. When the addressing pattern of the store operation used to implement PUSH EBX is provided to stack file 132, stack file controller 202 may check stack file storage 204 for a matching addressing pattern. Assuming that the addressing pattern misses in the stack file storage 204, the stack file controller 202 may allocate an entry (either by using an unallocated entry or by overwriting an already allocated entry) to store all or some of the addressing pattern of the push instruction and the tag of the source operand. In the illustrated embodiment, the tag is the physical register identifier of the physical register currently assigned to EBX (for ease of reference, however, the tags in FIGS. 2D and 2E are shown as logical register identifiers). The stack file controller may store the addressing pattern as ESP+0. Since the addressing pattern misses in the stack file storage, the stack file controller 202 may not output a tag for that addressing pattern.

The next two instructions may be used to store two parameters, the values stored in EDI and ESI, onto the stack for use by the subroutine. Assuming the addressing pattern's for the next two store operations in the calling routine (used to implement PUSH EDI and PUSH ESI) also miss in the stack file storage 204, the stack file controller 202 may allocate two more entries to store the tags and addressing patterns for each of these store operations. Additionally, each time a push instruction (which decrements the stack pointer) is detected, the stack file controller may modify the displacements included in existing stack file entries whose addressing patterns specify the stack pointer ESP. Thus, when PUSH EDI is detected, the stack file controller 204 may increase the displacement in the entry allocated in response to PUSH EBX by four (so that the entry's displacement becomes ESP+4). Similarly, when PUSH ESI is detected, the stack file controller 204 may increase the displacement in both the entry allocated in response to PUSH EBX and the entry allocated in response to PUSH EDI. Thus, the addressing pattern in the entry allocated in response to PUSH EBX may be updated to specify ESP+8 and the addressing pattern in the entry allocated in response to PUSH EDI may be updated to specify ESP+4. Accordingly, after the operations included in the instruction PUSH Parameter 1 are dispatched, the addressing patterns included in the stack file may appear as shown in FIG. 2D.

In response to the instruction CALL SUB1, the instruction pointer is pushed onto the stack (to be used as the return address). Since the stack pointer is modified in response to the CALL instruction, the displacements included in entries in the stack file whose addressing patterns specify the stack pointer may be updated. For example, the addressing pattern included in the entry allocated in response to PUSH EBX may be updated to specify ESP+12. The CALL instruction may include a store operation that updates the stack file. For example, the stack file may also allocate a stack file entry (not shown in FIGS. 2D–2E) in response to CALL SUB1 (e.g., having a tag equal to the physical register identifier of the physical register currently assigned to EIP and an addressing pattern equal to ESP+0).

Within subroutine SUB1, the instruction PUSH EBP may cause a new stack file entry to be allocated (having a tag equal to the physical register identifier of the physical register currently assigned to EBP and an addressing pattern of ESP+0). Additionally, since the push modifies the stack pointer, the displacements included in addressing patterns specifying the stack pointer may be modified (e.g., each may be incremented by four).

In response to the instruction MOV EBP, ESP, the stack file controller may update each entry whose addressing pattern specifies ESP to instead specify EBP, as shown in FIG. 2E. Thus, the addressing pattern ESP+12 may be updated to specify EBP+12 and so on.

The next instruction, SUB ESP, 4 allocates space on top of the stack for the subroutine to store a local variable. Since in this example, the stack file is currently tracking EBP modifications, the stack file may not allocate or modify any entries in response to this instruction. However, note that in other embodiments such as those that addressing pattern adjustment values, such an instruction may result in one or more updates to addressing pattern adjustment values and/or entries' addressing patterns to reflect the changes to ESP.

When the addressing pattern for MOV EAX, [EBP+8] is provided to the stack file, the addressing pattern for the source operand, [EBP+8] matches one of the addressing patterns included in the stack file. Accordingly, the stack file may output the tag in the matching entry. Here, the tag in the matching entry is the physical register identifier of the physical register that was assigned to ESI when the matching entry was allocated. This tag may be used to link the data value in that physical register to a speculative result of MOV EAX, [EBP+8]. Similarly, when the addressing pattern for MOV EBX, [EBP+12] is provided to the stack file, the addressing pattern matches an existing entry the stack file may output the tag included in the matching entry, which in this example identifies the physical register assigned to EDI when the entry was allocated.

The addressing pattern for the destination operand of MOV [EBP−4], EBX may miss in the stack file 132. Accordingly, the stack file may allocate a new entry having an addressing pattern of EBP−4 and a tag of the physical register identifier of the physical register currently assigned to EBX. When the addressing pattern of the source operand of the load operation included in ADD EAX, [EBP−4] is provided to the stack file, the addressing pattern hits and the tag (identifying the physical register assigned to EBX when the matching entry was created) stored in the matching entry is output.

The instruction MOV ESP, EBP copies the stack frame pointer value to the stack pointer. In response to this copy instruction, the stack file controller may invalidate any stack file entries whose addressing patterns specify ESP. Additionally, the stack file controller may update any stack file entries whose addressing patterns specify EBP to instead specify ESP. In one embodiment, the stack file controller may be configured to invalidate any entries whose addressing patterns are modified to specify a negative displacement and the stack pointer. For example, in such an embodiment, the entry allocated in response to MOV [EBP−4], EBX may be invalided if its addressing pattern is modified to specify ESP−4.

The instruction POP EBP returns the stack frame pointer value to the value it had in the calling routine. The addressing pattern for the source operand of the load operation included in the POP instruction, ESP, hits in the stack file (after the addressing pattern EBP+0 is modified to specify ESP+0 as described above) and thus the stack file may output the tag included in that entry. Since the add operation included in the POP instruction modifies the stack pointer value after the popped value is loaded, the stack file controller may then modify each address pattern that specifies the stack pointer (e.g., by subtracting four from the displacement included in each address pattern).

Note that while some instructions, such as push and pop instructions, include several component operations such as store or load operations, these instructions may be dispatched and scheduled as a single instruction in some embodiments. In other embodiments, one or more of the component operations included in such an instruction may be dispatched and scheduled separately. For example, for a pop instruction, an operation to increment the stack pointer may be dispatched and scheduled separately from an operation to load the data at the top of the stack into a particular register.

Since stack file 132 is being used as a speculative structure, the accuracy of the information stored in stack file storage 204 may not be critical to the correct operation of microprocessor 100 (e.g., mispredictions in stack file 132 may not cause errors in the output of microprocessor 100). However, it may be desirable to improve the accuracy of stack file 132 in order to increase the benefits provided by correctly linking the speculative results of load operations to values stored in physical registers and/or to decrease any performance penalties incurred for mispredicted speculative links. In some embodiments, entries within stack file storage 204 may be invalidated in response to snooping another device gaining write access to data at a particular address. Similarly, an entry may be invalidated in response to detection of a misprediction. Generally, many conditions such as these that may affect the accuracy of the entries in the stack file storage 204 may be monitored and used to determine when to invalidate entries. However, since stack file 132 is a speculative structure, some embodiments may not implement some of these monitoring methods (e.g., if the additional hardware cost to implement certain monitoring methods outweighs the potential improvement in stack file accuracy).

Note that stack file 132 allows dependencies between operations that are relatively removed from each other in the operation stream to be used to link values to speculative results. Thus, a stack file may provide a dependency history between operations that may be separated by several intervening operations.

Figure 3:
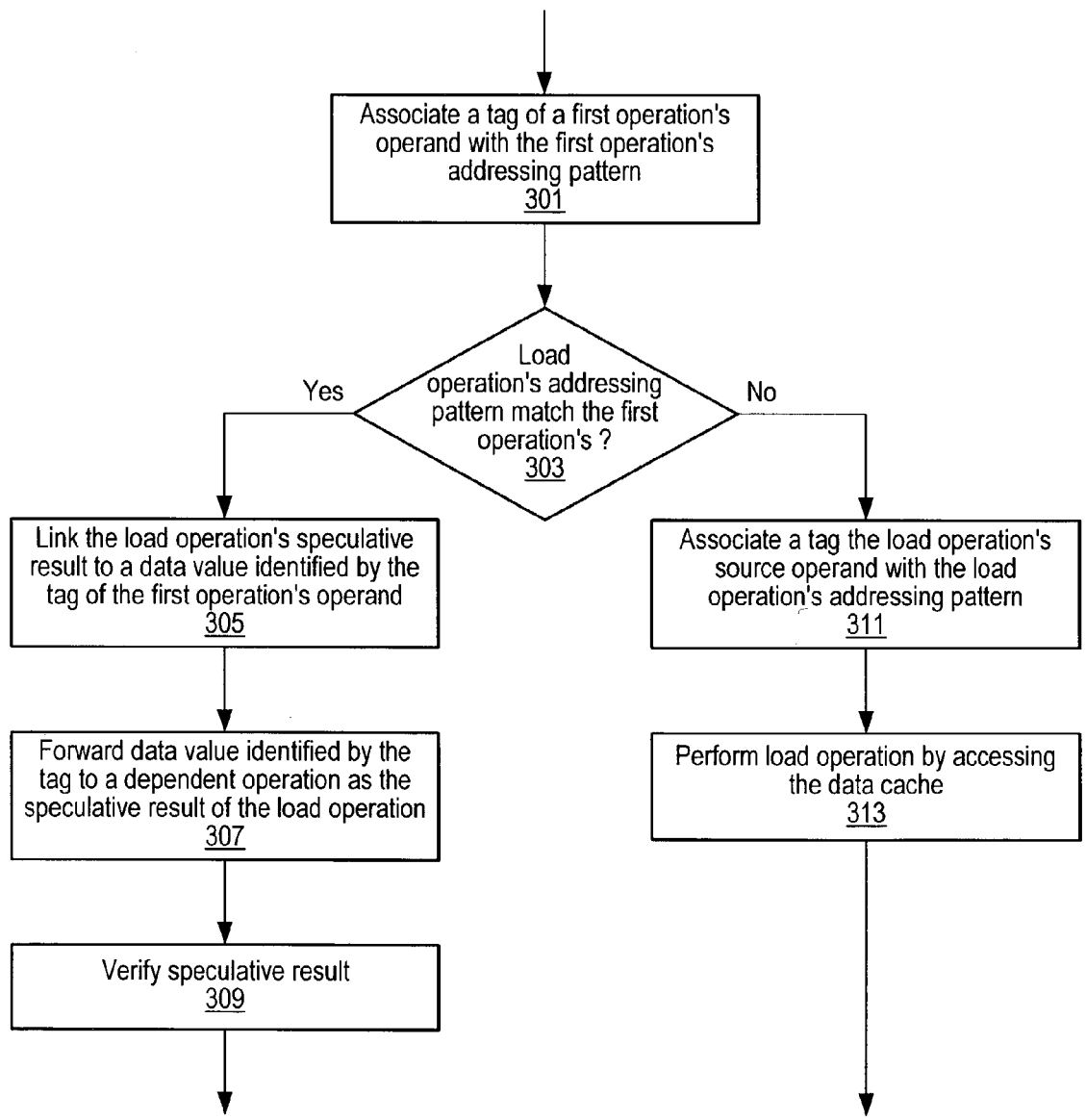
FIG. 3 is a flowchart showing one embodiment of a method of linking the speculative result of a load operation to a data value identified by a particular tag.

FIG. 3 shows a flowchart of one embodiment of a method of linking the speculative result of a load operation to a register value. At 301, a tag is associated with an addressing pattern, indicating that both are likely to identify the same data value. Both the tag and the addressing pattern are specified for a first load or store operation. For example, if the first operation is a load operation, the tag may identify the physical register allocated to store the result of the load and the addressing pattern may be the used to calculate the address for the load. If instead the first operation is a store operation, the addressing pattern may indicate the address of the store's destination and the tag may identify the data being stored by the store operation. In some embodiments, the tag and the addressing pattern may be associated by storing both in an entry in a stack file. Note that the addressing pattern may be modified according to an addressing pattern adjustment value (e.g., obtained by tracking earlier modifications to the stack pointer value) before being associated with the tag.

If a load operation's addressing pattern matches the addressing pattern of the first operation, the load's speculative result may be linked to the data value identified by the tag specified for the first operation, as indicated at 303–305. If the load operation's addressing pattern does not match that of the first operation, the load's addressing pattern and the tag for the load's destination may be associated (e.g., by storing both in an entry in a stack file), as indicated at 303–311. Furthermore, the load may be performed normally by accessing the data cache, as shown at 313. In one embodiment, the load operation's addressing pattern may be compared to more than one prior operation's addressing pattern. For example, the load's addressing pattern may be compared to each addressing pattern currently stored in a stack file. Note also that in some embodiments, the load operation's addressing pattern may be modified according to an addressing pattern adjustment value before being compared to the prior operation's addressing pattern.

If the load's speculative result is linked to a data value identified by the tag, that data value may be forwarded to one or more dependent operations as the speculative result of the load operation, as indicated at 307. The data value may be forwarded through result forwarding or by forwarding an indication that dependent operations may use the data value as a speculative operand source, as will be described in more detail below. In one embodiment, if the data value is forwarded via result forwarding, dependent operations may be executed using the forwarded data value one cycle after an operation that generates the data value completes execution. If the data value is forwarded via an indication that dependent operations may use the physical register as a speculative operand source, dependent operations may be issued as soon as the operation that generates the data value completes execution. The speculative result may be forwarded before the speculative result is verified, as indicated at 309. The speculative result may be forwarded without accessing the data cache (i.e., the speculative result may be forwarded sooner than the non-speculative result, which is generated by accessing the data cache).

If the speculative result is verified to be correct at 309, the load operation may be completed without performing a data cache access. In other embodiments, the load operation may be performed regardless of whether the speculative result is verified to be correct. If the speculative result is determined to be incorrect at 309, the data cache access may be performed in order to obtain the correct result (not shown). If so, any dependent operations that executed using the speculative result of the load may be reexecuted using the load's correct result. Note that in some situations, the verification (at 309) may be performed before the linked data value is forwarded as the speculative result of the load (at 307). In such situations, the load may be performed normally or, if the link is determined to be correct, the data value may be forwarded as the non-speculative result of the load operation.

Memory File

FIG. 4A shows one embodiment of a dispatch unit 104 that includes a memory file 136. Memory file 136 includes a memory file controller 402 and memory file storage 404. Memory file 136 may be used to link register values stored in physical registers to values stored in particular addresses in memory based on addressing patterns. Unlike the stack file, the memory file may be used to link register values to memory values in areas of memory other than the stack area. In some embodiments, memory file 136 may also implement some of the functionality of a stack file 132, as described above, in order to additionally link register values to memory values within the stack area of memory. Alternatively, dispatch unit 104 may also include a separate stack file 132 to implement such functionality.

Memory file storage 404 includes one or more entries 420. Each entry 420 may include an addressing pattern 406 and a tag 408 associated with that entry's addressing pattern. Each tag 408 may identify a data value by indicating where that data value will be stored (e.g., within a reorder buffer or within a register file 116) when it is generated. For example, as shown in the illustrated embodiment, each tag 408 may identify the physical register allocated to store that data value, as indicated by register map 134. Each addressing pattern 406 may include all or some of the information used to specify an address in an operation. Addressing patterns 406 stored in memory file 136 may include information similar to the addressing patterns 206 stored in stack file 132. Note that in some embodiments, the addressing pattern 406 stored in memory file storage 404 may include less than all of the addressing information specified for an operation. In other embodiments, the memory file controller 402 may selectively choose whether to allocate an entry in memory file storage 404 dependent on whether an entry in the memory file can store all of the addressing information for a particular operation. Like stack file storage 204, memory file storage 404 may be implemented from several registers, latches, flip-flops, one or more RAM (Random Access Memory) cells, etc.

Memory file controller 402 may compare the addressing patterns specified in undispatched operations to those stored within entries 420 in memory file storage 404. If an operation's addressing pattern does not match any of the addressing patterns 406 currently stored within entries in memory file storage 404 (i.e., the operation's addressing pattern misses in the memory file storage), memory file controller 402 may allocate a new entry 420 in memory file storage 404 to store all or some of that operation's addressing pattern. If there are no free entries to allocate within memory file storage 404, memory file controller 402 may select an entry to overwrite using a replacement scheme such as LRU (Least Recently Used), FIFO (First In, First Out), random replacement, etc. In addition to storing the operation's addressing pattern within the allocated entry, the memory file controller 402 may also store a tag 408 (e.g., the name of the physical register) identifying a value being loaded from or stored into the memory location identified by that operation's addressing pattern. For example, if an operation that loads data from memory is being handled, the entry 420 allocated in response to that operation may store the name of the physical register allocated to store the result of the load operation. If an operation that stores data to a memory location is being handled, memory file controller 402 may store the physical register name of the register storing the value being stored by the store operation in memory file storage 404.

If an operation's addressing pattern (or a portion of that pattern) is already stored an entry in memory file 404 (i.e., the operation's addressing pattern hits in the memory file storage), the memory file controller 402 may use or modify the entry containing the matching addressing pattern. If a load operation (an operation that loads a value from a particular address into a register) is being handled, the memory file controller 402 may output the physical register name stored in the matching entry. If a store operation (an operation that stores a value from a register to a particular address) is being handled, the memory file controller 402 may overwrite the tag (e.g., the physical register name) stored in the matching entry with the tag of the data being stored.

In some embodiments, if an operation that specifies a particular logical register (other than the logical registers used to store the stack pointer and stack frame pointer) as a destination operand is dispatched, the memory file controller 402 may invalidate any entry 420 that includes that logical register as part of its addressing pattern 406. Thus, logical register names of the destination register of each operation may be input to memory file 136 in order to perform entry invalidations. Additionally, in some embodiments, entries within memory file storage 404 may be invalidated in response to snooping another device gaining write access to data at a particular address. Similarly, an entry may be invalidated in response to detection of a misprediction.

If memory file 136 also allocates entries for operations whose addressing patterns specify locations within the stack area of memory, memory file controller 402 may include one of the stack file compensation mechanisms described above for use with those entries. Those entries may alternatively be maintained in a separate stack file 132 (i.e., memory file 136 may not allocate entries to operations whose addressing patterns specify locations within the stack). In general, memory file controller 402 may distinguish between addressing patterns that specify locations within the stack area and addressing patterns that specify other locations within memory based on which logical register identifiers are included in each addressing pattern. Since the memory file 136 is a speculative structure, the potential inaccuracies that may arise from using such a mechanism to distinguish addressing patterns may be acceptable.

In some architectures, the logical register (e.g., a base pointer register such as EBP) used to specify the stack frame pointer may also be used as a general purpose register. Accordingly, addressing patterns 406 that include such a dual-purpose register may specify either a location within the stack area of memory or a location that is not included in the stack area. In order to distinguish between such addressing patterns, memory file controller 402 may include a mechanism that tracks the current likelihood of the base pointer register being used as a stack frame pointer. Such a mechanism may include a flag that is set when the base pointer register is likely to be acting as the stack frame pointer and cleared when the base pointer register is likely to be acting as a general purpose register. For example, such a flag may be set in response to a CALL instruction and cleared in response to a RET operation. In other embodiments, such a flag may be set in response to a ENTER instruction and cleared in response to a LEAVE instruction. Alternatively, such a flag may be set in response to dispatch of a MOV EBP, ESP operation and cleared in response to dispatch of a MOV ESP, EBP operation. When the flag is set, the memory file controller 402 may inhibit handling of operations whose addressing patterns include the base pointer register (in embodiments where the memory file 136 does not include stack file functionality). In such situations, a stack file 132 may instead handle those operations, or those operations may not be handled at all. Alternatively, in embodiments where the memory file 136 also implements stack file functionality, the memory file controller 402 may handle those operations input to the memory file when the flag is set as having stack-relative addressing patterns. If those operations are input to the memory file when the flag is cleared, the operations may be handled as having non-stack-relative addressing patterns.

In some embodiments, additional information may be maintained by the memory file controller 402 in order to more accurately handle dual-use logical registers in the context of nested subroutines. For example, instead of just maintaining a flag indicating whether a CALL instruction has been handled, the memory file controller 402 may track the "call depth." Call depth may indicate the current nesting level and be used to determine how a particular base pointer register addressing pattern should be handled by the memory file controller 402 (or whether such an operation should be handled at all).

In one embodiment, the memory file controller 402 may include a counter that tracks the call depth. The call depth counter may initially be set to zero in some embodiments. Each time a CALL instruction is handled, the memory file controller 402 may increment the call depth counter. Each time a RET instruction is handled, the memory file controller 402 may decrement the call depth counter. When an entry 420 is allocated, the memory file controller 402 may append the current call depth to that entry if the addressing pattern 406 includes the base pointer logical register identifier.

When operations whose addressing patterns include the base pointer register are subsequently handled by memory file controller 402, the current call depth may be compared to the call depth stored in each entry. If the call depths do not match, the operations will not hit in the memory file 136. For example, a sequence of instructions may include:

```
MOV EAX, [EBP + 20]
CALL
<operation that sets new value of EBP for the subroutine>
MOV EBX, [EBP + 20]
RET <restores pre-CALL value of EBP>
MOV ECX, [EBP + 20]
```

Each instruction may be separated by one or more intervening instructions. Before this sequence of instructions is handled by the dispatch unit 104, the call depth in the memory file controller 402 may equal 1. When handling the MOV EAX, [EBP+20] operation, the memory file controller 402 may compare EBP+20, with call depth=1, to the addressing patterns stored in other entries within the memory file storage 404. Assuming none of those addressing patterns match, the memory file controller 402 may allocate a new entry to store the addressing pattern EBP+20 and a tag identifying EAX. The memory file controller 402 may additionally append a value identifying the current call depth (e.g., 1) to a call depth field within the new entry. Note that memory file controller 402 may only append such a value to entries storing addressing patterns that include the base pointer in many embodiments.

In response to dispatch of the CALL operation, the memory file controller 402 may update the current call depth (e.g., by increasing the current call depth to equal 2). An operation in the called subroutine may update the value of the stack frame pointer EBP (e.g., MOV EBP, ESP). Since the call depth in the entry does not match the current call depth, the memory file controller 402 may not invalidate the entry due to the update of EBP. Furthermore, due to the update to EBP, MOV EBX, [EBP+20] should not hit in the memory file, since the current memory file entry having an addressing pattern EBP+20 is based on a different value of EBP. In order to correctly determine that the addressing pattern of MOV EBX, [EBP+20] does not match the addressing pattern already stored in the memory file storage, the memory file controller may compare the current call depth (2) to the call depth (1) of the existing entry. Since the current call depth differs from that of the existing entry, the memory file controller may determine that the new instruction misses in the memory file. Accordingly, the memory file controller may allocate an entry to store EBP+20 and append a value indicating the current call depth to that entry. Note that there may now be (at least) two memory file entries having the addressing pattern EBP+20. When the RET instruction is handled, the memory file controller may decrease the current call depth (e.g., to 1 again). Since the current call depth equals the call depth when an entry was allocated to MOV EAX, [EBP+20], MOV ECX, [EBP+20] may hit in the memory file. Note that in some embodiments, the memory file controller 402 may invalidate entries whose call depth is greater than the current call depth.

In embodiments that include both a stack file 132 and a memory file 136, various mechanisms may determine which structure allocates an entry in response to a particular operation. In some embodiments, both the stack file 132 and the memory file 136 may allocate entries in response to operations having stack-relative addressing patterns (e.g., addressing patterns including EBP or ESP). In other embodiments, this redundancy may be eliminated by combining the stack file 132 and the memory file 136 into a single structure.

In other alternative embodiments, the memory file 136 may not allocate entries to and determine memory file hits and/or misses for operations whose addressing patterns specify the stack pointer. The memory file 136 may selectively handle (or not handle at all) operations having addressing patterns that specify the base pointer register or other dual-use logical registers. In one embodiment, if the memory file 136 selectively handles operations whose addressing patterns specify the base pointer register, the memory file 136 may determine whether to handle a particular operation based on whether a stack frame pointer addressing pattern adjustment value in the stack file controller 202 is valid or based on a flag indicating whether a subroutine is being handled, as described above. While the stack frame pointer addressing pattern adjustment value is valid, the stack file 132 may handle addressing patterns that include the base pointer register. While the stack frame pointer addressing pattern adjustment value is invalid, the memory file 136 may handle such operations.

If a load operation is being handled and the load operation hits in the memory file storage 404, the tag output by the memory file controller 402 may be used to link the value stored identified by the tag to a speculative result of the load operation. For example, in some embodiments, when the load operation is dispatched to scheduler(s) 118, the tag output by memory file 136 may also be provided to the scheduler(s) (e.g., as a speculative source operand tag). A scheduler 118 may issue the operation in response to the availability (e.g., in register file 116 or on result bus 130) of the value identified by that tag. An execution core 124 may execute the load operation so that the linked value is broadcast as the speculative result of the load operation on result bus 130 (note that the data value produced as the load's result may not itself be flagged or otherwise identified as a speculative value in some embodiments). In other embodiments, the data value may be linked to the speculative result of the load operation by storing the tag in a speculative map, as described below.

In order to further illustrate the operation of memory file 136, assume that a sequence of operations to be handled by dispatch unit 104 includes the following operations:

| MOV EBX, [EDX + EAX − displacement A] | (LOAD 1) |
| ... | |
| MOV ECX, [EDX + EAX − displacement A] | (LOAD 2) |
| ... | |
| MOV [EDX + EAX − displacement A], EAX | (STORE 1). |

Each of these operations may be separated by one or more intervening operations in program order. As shown, each of these three operations includes the same addressing pattern, EDX+EAX−displacement A.

When LOAD 1's addressing pattern is provided to memory file 136, memory file controller 402 may check memory file storage 404 for an addressing pattern that matches LOAD 1's addressing pattern. Assuming that the addressing pattern misses in the memory file storage 404, the memory file controller 402 may allocate an entry (either by using an unallocated entry or by overwriting an already allocated entry) to store all or some of the addressing pattern of the load operation and the physical register name of the load operation's destination physical register as provided by register map 134. Since the load operation misses in the memory file storage, the memory file controller 402 may not output a tag for that load operation.

When LOAD 2 is subsequently handled by memory file 136, its addressing pattern may match the addressing pattern in the entry allocated in response to LOAD 1 (assuming LOAD 1's entry has not been already been overwritten in response to an intervening operation). In response to LOAD 2's addressing pattern hitting in memory file storage 404, memory file controller 402 may output the physical register name of the physical register allocated to store the result of LOAD 1. This physical register name may be used to link the data value loaded by LOAD 1 to the speculative result of LOAD 2.

When STORE 1 is handled by memory file 136, its addressing pattern may hit in the entry allocated in response to LOAD 1 (again assuming that no intervening operation has caused this entry to be overwritten). Instead of outputting the physical register name of the physical register allocated to store the result of LOAD 1 (as was done for LOAD 2) however, memory file controller 402 may overwrite the physical register name stored in that entry with the physical register name of the register containing the data being stored by STORE 1. Thus, when subsequent load operations hit in this entry, the memory file controller 402 will output the physical register name of STORE 1's source physical register instead of outputting the physical register name of LOAD 1's destination register.

As shown, stack file 132 and/or memory file 136 track the addressing patterns in operations that access data in data cache 128 (or system memory 200). As a result, register values stored in physical registers may be linked to values stored in particular addresses in memory.

Scheduling of Operations Having Speculative Sources

Various embodiments may link a load operation's speculative result to a register data value in many different ways. In some embodiments, values may be linked by identifying two sources for an operand: a speculative source and a non-speculative source. The speculative source may be the linked data value. Speculative sources may be provided for load operations to indicate the data value linked to the speculative result of the load. In some embodiments, speculative sources may also be provided for operations dependent on such a load operation. Accordingly, some operands may have two tags: one identifying the speculative source and one identifying the non-speculative source. In such embodiments, each scheduler 118 may provide tag storage for both the speculative operand and the non-speculative operand, as shown in FIG. 5.

Figure 5:
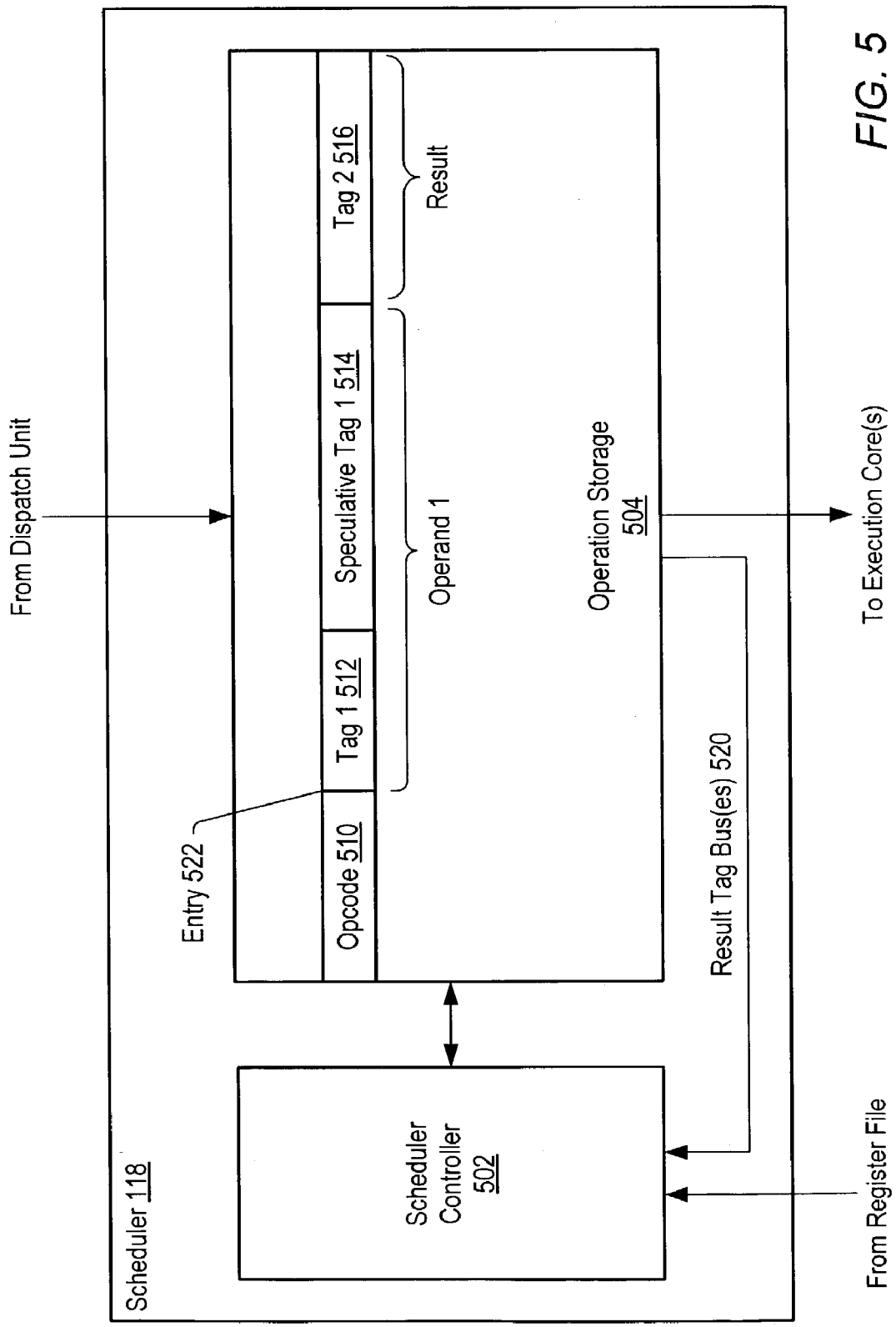
FIG. 5 is a block diagram of a scheduler, according to one embodiment.

FIG. 5 shows one embodiment of a scheduler 118 that may be included in a microprocessor. In the illustrated embodiment, the scheduler 118 includes a scheduler controller 502 and an operation storage 504. In response to dispatch unit dispatching an operation, scheduler controller 502 may allocate an entry within operation storage 504 to store information corresponding to the operation. For example, an entry 522 in operation storage 504 may include an opcode field 510, one or more operand fields, and a result field 516. The result field 516 may store a tag identifying the physical register in which the result of that entry's operation should be stored. When the operation is issued, this tag may be forwarded to each scheduler 118 on one of one or more tag buses 520. Each scheduler may compare the tags forwarded on tag buses 520 to the operand tags (both speculative and non-speculative, as described below) for pending operations in order to determine when the pending operations' operands will be available. Accordingly, an operation may be issued (or marked as being ready to issue) in response to its source operand tags appearing on tag bus 520.

Each operand field(s) may include storage for a speculative tag identifying a speculative operand source and a non-speculative tag identifying a non-speculative operand source. In the illustrated entry 522, operand 1's two sources are identified by non-speculative tag 512 and speculative tag 514. The scheduler 118 may be configured to issue an operation in response to one or more indications that the operation's operands are available. An operand is available if it is available from either a speculative source or a non-speculative source. If an operand is available from both a speculative source and a non-speculative source, the operation may be executed using the value available from the non-speculative source. In some embodiments, the scheduler 118 may prioritize issuing operations whose non-speculative operand sources are available over operations for which only speculative operand sources are available.

Note that an operation may include some operands that have speculative sources and other operands that do not have speculative sources. Also note that the same source may be a speculative source for one operation and a non-speculative source for another operation. In some embodiments, when an operation is executed, only one data value may be read for each operand (e.g., the execution core 124 may read either the speculative operand source or the non-speculative operand source, but not both). This may make it unnecessary to add additional ports into the register file 116. Speculative sources and physical sources may be stored in the same storage locations (e.g., within register file 116) and speculative sources may not be flagged or otherwise identified as speculative sources in some embodiments.

In many embodiments, scheduler 118 may be configured to keep entries allocated to operations after those operations have been issued to execution core(s) 124. When an operation is issued by scheduler 118 in response to the availability of one or more speculative operands, the scheduler may keep an entry 522 allocated to that operation so that the operation can be reissued if the speculative link is incorrect. In some embodiments, the load/store unit may be configured to verify speculative links that arise when a speculative load result is linked to a data value stored in a physical register. If the link is correct, the load store unit may be configured to not broadcast a non-speculative result of the load, since the correct result is already available through the link. If so, the scheduler(s) 118 may be configured to reissue an operation if a tag identifying a non-speculative operand source for that operation is broadcast on result bus 130.

Alternatively, the load/store unit may broadcast the result of the store along with an extra status bit that masks the broadcast or indicates that the speculative link was correct and that the load should not be reissued. However, if the speculative link is incorrect, the load/store unit may perform a data cache and/or memory access in order to obtain the correct result for the load and broadcast the result of the load. In embodiments where results are always broadcast, the additional status bit may indicate that the speculative link was incorrect. Thus, in many embodiments, the same tag and result buses already available in a microprocessor may be used to indicate that a speculative link is incorrect. In other embodiments, alternative indication mechanisms (e.g., using separate result buses 130 and/or result tag buses 520 to indicate mispredictions) may be implemented.

Figure 6:
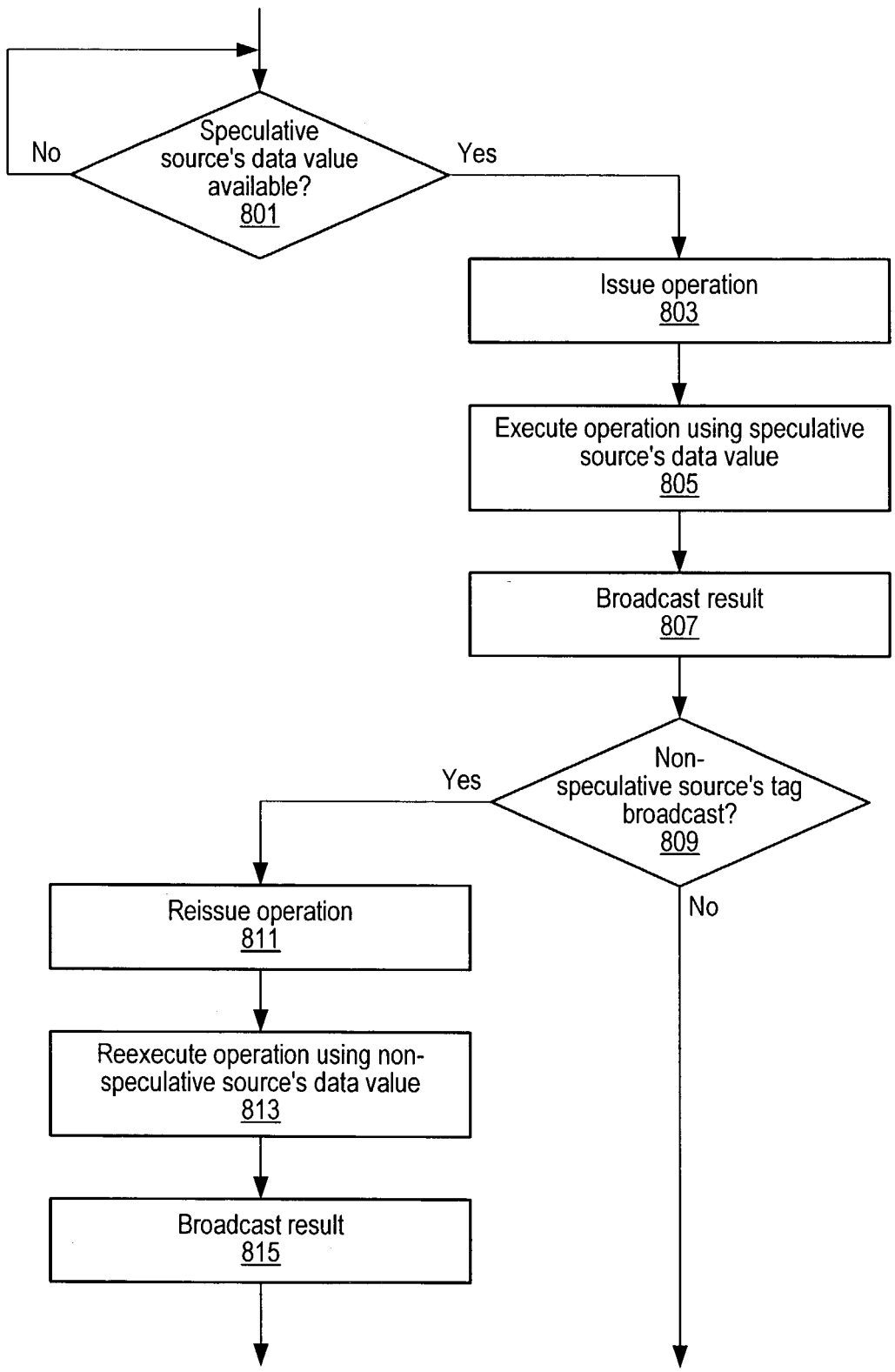
FIG. 6 is a flowchart of one embodiment of a method of issuing operations and reissuing operations in response to an indication that data speculation was incorrect.

FIG. 6 shows a flowchart of one embodiment of a method of issuing and reissuing operations that have both speculative and non-speculative operand sources. If an operation's speculative operand source is available, the operation may be issued, as shown at 801–803. An operation's speculative operand source may become available when a data value is present in a particular register within the register file or when the data value is output on the result bus. Note that in some situations, the operation's non-speculative operand source for the same operand may be available before the speculative operand source. In those situations, the operation may be issued before the speculative operand source becomes available. Subsequent availability of the speculative source may not trigger reissue of the operation in some embodiments.

The issued operation may be executed using the data value provided by the speculative operand source, as indicated at 805, and the result of the operation may be broadcast, as indicated at 807. Broadcasting the operation's result allows dependent operations to execute.

If at some later time the speculative source is determined to be incorrect (e.g., the data value provided by the speculative source and the non-speculative source are not the same, or a speculative link used to generate the tag of the speculative source is not correct), the tag of the non-speculative source may be broadcast as an indication that the speculative source's value is incorrect. Broadcasting the tag of the non-speculative source involves broadcasting the tag in such a way that the scheduler(s) respond by reissuing the operation. For example, in some embodiments, a scheduler may respond if the tag is broadcast and a status flag associated with the tag is set to a certain value, while in other embodiments there may not be an associated status flag and a scheduler may be configured to reissue an operation any time the non-speculative tag is broadcast.

Speculative Register Map

Figure 7:
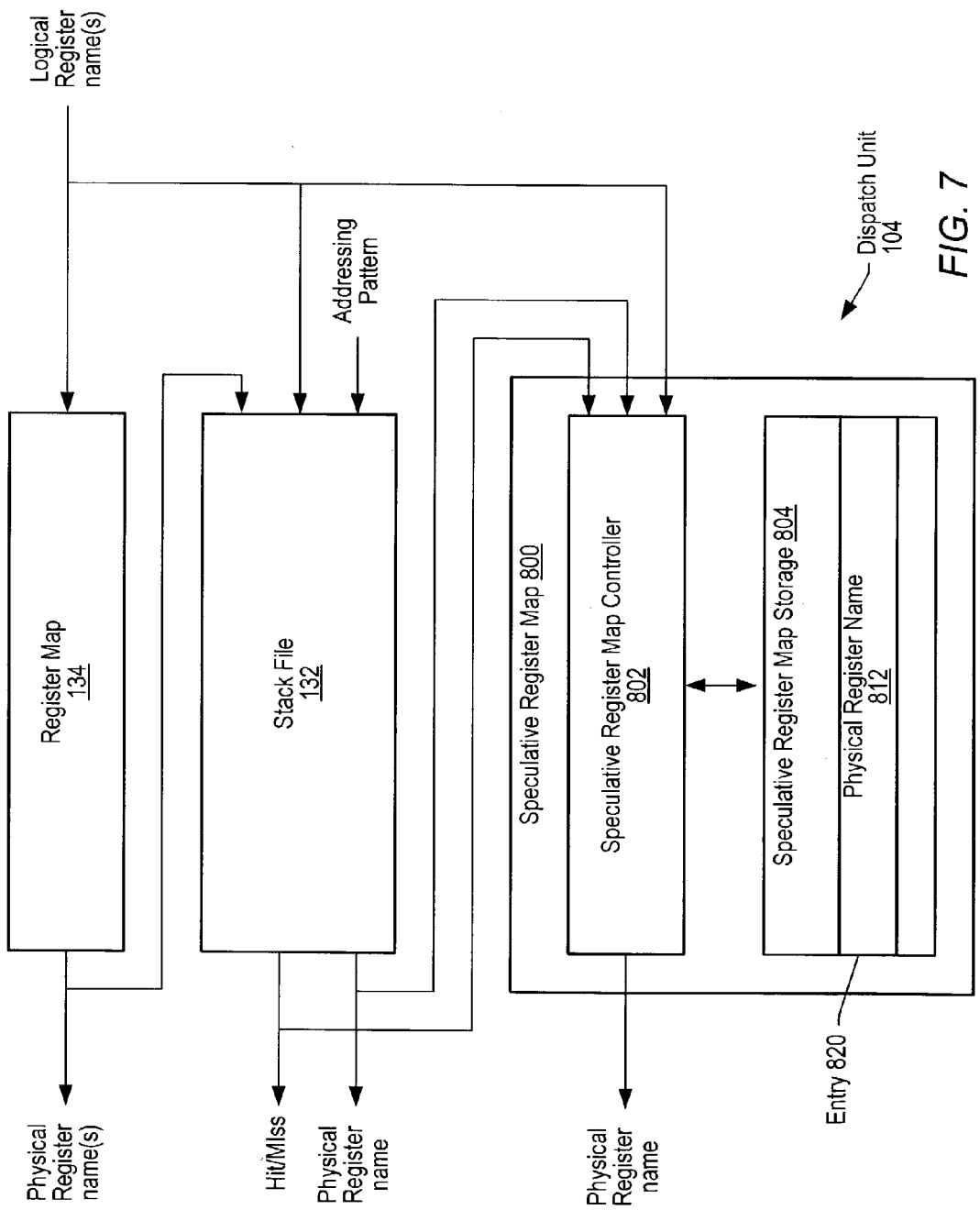
FIG. 7 is a block diagram of a dispatch unit, according to some embodiments.

FIG. 7 shows another embodiment of a dispatch unit 104 that may be included in a microprocessor 100. In this embodiment, dispatch unit 104 includes a register map 134, a stack file 132 (and/or a memory file 136, not shown), and a speculative register map 800. Like register map 134, speculative register map 800 may translate logical register names to physical register names. However, speculative register map 800 may speculatively map a logical register name to a physical register name in response to stack file 132 (and/or memory file 136) linking a value stored in a physical register to a speculative result of a load operation. The speculative register map 800 may allow speculative operand values for operations that do not include addressing patterns to be linked to register data values. For example, if there is a valid speculative map for logical register EAX, an operation having EAX as a source operand may have two source tags: a non-speculative tag provided by register map 134 and a speculative tag provided by speculative register map 800. Since the operation may issue as soon as its speculative source is available, speculative register map 800 may link data consumers directly to data producers via a speculative operand tag, bypassing any intervening loads and stores. Note that while the speculative map may store tags other than physical register names in some embodiments (e.g., in embodiments having a reorder buffer that includes storage for speculative register states).

Speculative register map 800 includes a speculative register map controller 802 and speculative register map storage 804. Speculative register map storage may include one or more entries 820. Each entry 820 may be associated with a particular logical register and indicate a physical register identifier 812 of the physical register to which that logical register is currently speculatively mapped. Each speculative register map entry 820 may also include an indication (not shown) as to whether that entry is currently valid or not. In one embodiment, speculative register map storage 804 may include an entry for each logical register. In other embodiments, speculative register map 804 may include fewer entries than there are logical registers. In such embodiments, each entry 820 may include an indication of the logical register to which that entry currently corresponds.

Speculative register map controller 802 may be configured to update an entry 820 in response to an indication that a load operation's speculative result has been linked with a data value identified by a particular physical register name. In the illustrated embodiment, this indication is provided by the stack file 132. In other embodiments, such indications may also or alternatively be provided by a memory file 136. The entry 820 to update is the entry for the logical register specified as the destination of the load operation. The entry may be updated to include the physical register identifier output by the stack file 132 for that load operation.

In some embodiments, operations may be provided to speculative register map 800 during the same cycle that they are provided to register map 134. As register map 134 performs the non-speculative register renaming for an operation, speculative register map 800 may indicate whether any of the logical registers specified as storing one of the operation's speculative source operands are linked to a particular physical register. If a valid entry exists in speculative register map storage 804 for one of the operation's logical register sources, speculative register map controller 802 may output the physical register name stored in that logical register's entry. Dispatch unit 104 may output this speculative physical register name as a speculative source when the operation is dispatched to a scheduler 118. Thus, if an ADD operation is provided to speculative register map 800 and one of the ADD's sources has a valid entry in speculative register map storage 804, the tag for the physical register identified in that entry may be provided as a speculative source operand tag to scheduler 118. The scheduler may be configured to store both speculative and non-speculative operand tags, as described above, and may in some embodiments be configured to reissue operations (if already issued) in response to the non-speculative tag being broadcast on a result bus.

Entries within the speculative map may be invalidated in response to an indication that a data value for a particular logical register will be modified. For example, if an operation ADD EAX, ECX is handled by the dispatch unit 104, the speculative register map controller 802 may invalidate the speculative map entry currently assigned to EAX since the ADD operation will modify that register value.

Generally, speculative operand tags may be provided to scheduler 118 whenever one operation's speculative result is linked to a register data value. In some embodiments, a stack file 132 and/or memory file 136 as well as a structure that tracks dependencies over several cycles (e.g., a speculative register map 800 as described below) may be used to link speculative results to register values. For example, dispatch unit 104 may generate speculative tags for an operation in response to a stack file 132 or a memory file 136 identifying a link. In some embodiments, speculative tags may be generated without the use of such a speculative map. For example, a sequence of instructions may include:

| | |
|---|---|
| ADD EBX, EBX | (ADD 1), |
| MOV [addressing pattern A], EBX | (STORE 1) |
| ADD [addressing pattern A], ECX | (ADD 2). |

These instructions may be contiguous instructions (e.g., they may directly follow each other in program order). These instructions may be separated into the following component operations (shown with logical addresses translated to physical addresses) for execution within execution core(s) 124:

| | |
|---|---|
| ADD PR2, PR2, PR1 | (ADD 1) |
| MOV [addressing pattern A], PR2 | (STORE 1) |
| MOV PR3, [addressing pattern A] | (load for ADD 2) |
| ADD PR4, PR3, PR5 | (add for ADD 2) |
| MOV [addressing pattern A], PR4 | (store for ADD 2) |

Before the component load, add, and store operations of ADD 2 are dispatched, a dispatch unit 104 may detect whether there are any dependencies between any of the component operations in the sequence that would allow linking to speculative results. Additionally, the data being stored by STORE 1 may be linked to the load's speculative result (e.g., by a stack file). Since there are no intervening operations, dispatch unit may have all of the information needed to detect a dependency between the load operation and the add operation (both operations being derived from the same instruction) in the same dispatch cycle. Based on these two dependencies, the dispatch unit 104 may link the tag of the data being stored by STORE 1, PR2, to the speculative result of the load operation performed as part of ADD 2. This speculative link may in turn allow the dispatch unit to link the source of the addition operation performed as part of ADD 2 to the value stored in PR2. Accordingly, dispatch unit 104 may output an indication that PR2 may be speculatively used as the source of one of the operands for the addition but that PR3 is the non-speculative source for that operand. Thus, in one embodiment, the operations and operand identifiers output by dispatch unit may be specified as follows:

| | |
|---|---|
| ADD PR2, PR2, PR1 | (ADD 1) |
| MOV [addressing pattern A], PR2 | (STORE 1) |
| MOV PR3, [addressing pattern A] | (load for ADD 2) |
| ADD PR4, PR2*, PR3, PR5 | (add for ADD 2, where PR2* is a speculative source for ECX and PR3 is the non-speculative source for ECX) |
| MOV [addressing pattern A], PR4 | (store for ADD 2). |

Figure 8:
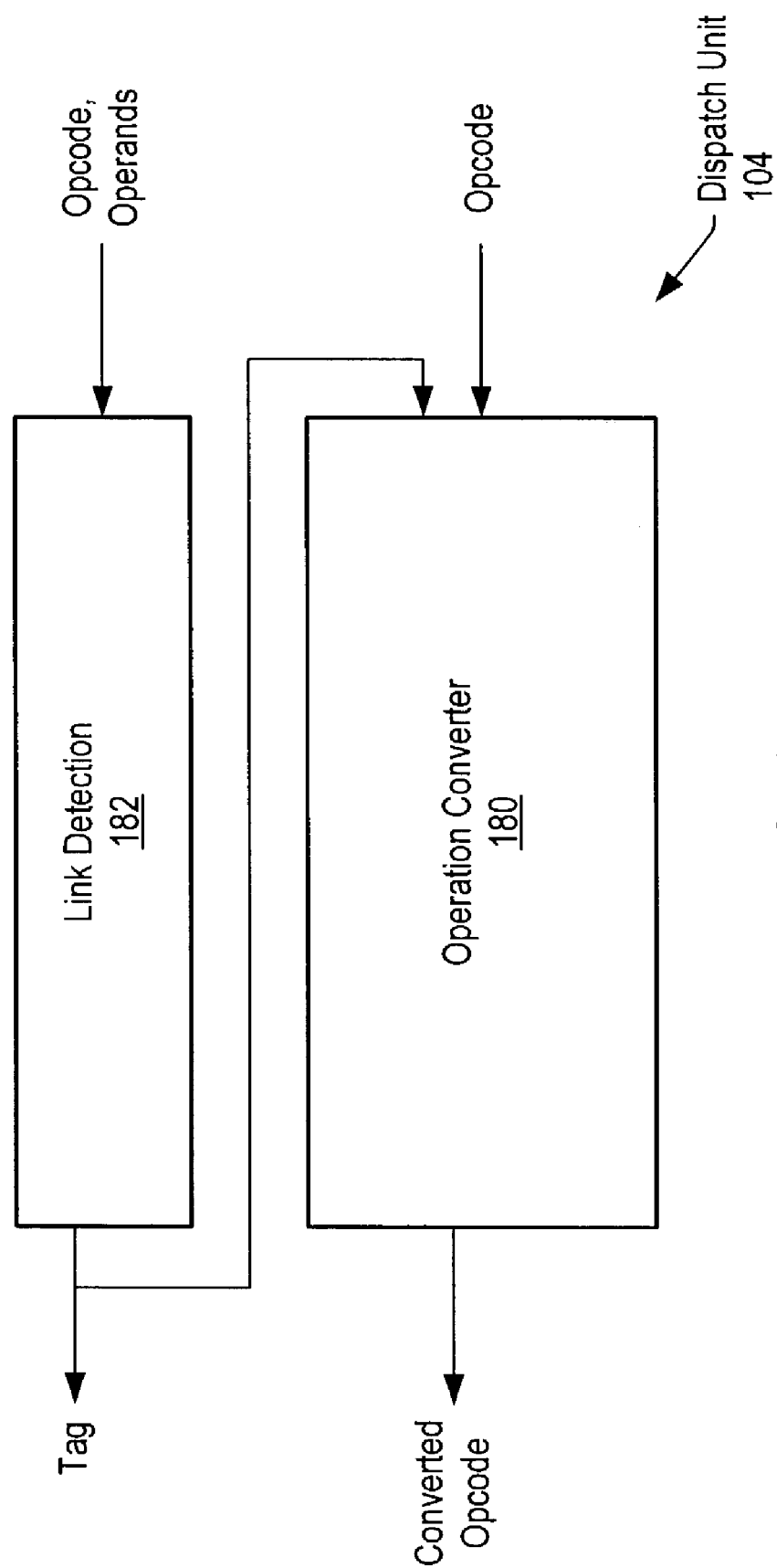
FIG. 8 is a block diagram of a dispatch unit, according to other embodiments.

In other embodiments, dispatch unit 104 may not be configured to identify speculative source operands for operations that depend on a load operation. Instead, dispatch unit 104 may include an operation converter 180, as shown in FIG. 8, configured to convert load operations into one or more operations that include a register-to-register move operation in order to provide speculative load results to dependent operations. The conversion of a load operation may be performed in response to an indication that a link exists between a speculative result of the load operation and a data value identified by a particular physical register name. This indication is provided by the link detector 182, which may include a stack file 132 and/or a memory file 136 in some embodiments. In other embodiments, the link detector 182 may include logic configured to link data values in response to operations such as a conditional move operation, as described above.

In one embodiment, the operation converter 180 may receive an input opcode for an operation as well as an indication as to whether a link between a register value and a speculative result of the operation is detected for that operation. If the operation is a load and a speculative link has been detected, the operation converter 180 may output an opcode for a register-to-register move operation. The dispatch unit 104 may dispatch the register-to-register move operation, using the tag output by the link detection unit 182 as the source operand tag for the register-to-register move.

In some embodiments, the operation converter 180 may be configured to dispatch the resulting register-to-register move such that the scheduler stores the operand tags needed for both the register-to-register move and the original load operation in the entry allocated to the register-to-register move operation. This may allow the operation to be reissued as the original load operation if the speculative result of the register-to-register move operation is detected to be incorrect. In order to implement this, an additional source operand may be added to each register-to-register move operation that results from modifying a load operation (or, in alternative embodiments, a source operand that is already present may be modified to implement this). In some embodiments, the speculative result of the register-to-register move operation may be verified by performing the address calculation for the original load and/or comparing the linked data value to the actual load result data value. If the speculative result is incorrect, the data cache may be accessed in order to obtain the correct load result. Rebroadcast of the correct load result may cause the scheduler 118 to reissue any dependent operations that were executed using the incorrect value.

In some embodiments, the operation converter 180 may be configured to convert a load operation into a dual-nature operation. Like a load operation, this dual-nature operation may involve both address calculation and data movement. Unlike a load, the data movement initiated by the dual-nature operation is a register-register move. Furthermore, the data movement initiated by the dual-nature operation may occur before the address calculation has completed. The address calculation may be used to verify whether the speculative link was correct. If the speculative link was incorrect, the dual-purpose operation may be reissued as a normal load operation and its result may be rebroadcast to dependent operations upon completion of a data cache access.

The following examples show how different embodiments may convert this exemplary sequence of operations:

| | |
|---|---|
| ADD PR2, PR1, PR1 | (ADD 1) |
| . . . | |
| STORE [addressing pattern A], PR2 | (STORE 1) |
| . . . | |
| LOAD PR3, [addressing pattern A] | (LOAD 1) |
| . . . | |
| ADD PR4, PR3, PR3 | (ADD 2) |

In this sequence, it is possible that the specified operations may be separated by one or more intervening operations. However, assuming that no intervening operations appear to modify the values used in addressing pattern A or to modify the data values stored at the address calculated from addressing pattern A and in PR2, a speculative link may be detected between the data values stored in PR2 and at the address calculated from addressing pattern A.

In one embodiment, in response to the detection of the speculative link by speculative link detector 182, operation converter 180 may convert LOAD 1 into a dual-purpose move operation: MOV PR3, PR2. In addition to specifying the register source and destination, this dual-purpose move operation may also specify addressing pattern A so that the address calculation for LOAD 1 may be performed. However, the move portion of the dual-purpose move operation may issue as soon as ECX is available. As soon as the result of the move portion of the dual-portion operation is broadcast, ADD 2 may issue, using the speculative result of the move operation as an operand. When the address calculation is performed, the speculative link may be verified. If the speculative link is incorrect, the load/store unit may provide an indication to the scheduler that causes the scheduler to reissue the dual-purpose move operation as a load operation. The result of the load operation may be broadcast, causing any dependent operations, such as ADD 2, which may have executed using the speculative result of the move to reissue. Note that this dual-purpose operation may be scheduled using a single scheduler entry and that a scheduler 118 may select the dual-purpose operation for issue twice: once for the load's address calculation and once for the register-to-register move.

In an alternative embodiment, operation converter 180 may convert LOAD 1 into two linked operations, LOAD PR3, [addressing pattern A] and MOV PR3, PR2, in response to detection of the speculative link. Unlike the earlier example, which involved a dual-purpose operation, these linked operations may each take up an entry in a scheduler 118 instead of sharing a single scheduler entry. When the register-to-register move operation issues, dependent operations such as ADD 2 may issue using the speculative value of PR3 as an operand value. The LOAD operation may be tagged as a special type of load operation so that, if the speculative link is determined to be correct, the load's result tag is not broadcast (or is broadcast with an indication that the move's result is correct and that the dependent operations should not reissue). Also, if both the load and the move operation broadcast their results on the same cycle, an indication may be provided so that the load result is used for dependent operations instead of the move result. In some embodiments, this may occur by adding an extra bit to each tag bus within the microprocessor 100 that indicates to which tag a scheduler should respond. If the speculative link is incorrect (e.g., as indicated by the broadcast of the load's result tag), the move operation may be cancelled (e.g., the scheduler 118 that schedules the move operation may deallocate the scheduler entry currently allocated to the register-to-register move so that the operation cannot reissue). In many embodiments, the scheduler may be configured to reissue any dependent operations that executed using the speculative load result in response to the load result tag reappearing on the result bus. In alternative embodiments, the scheduler 118 may be configured to issue both linked operations at the same time. In such an embodiment, both linked operations may use read ports into the physical register file that would otherwise have been used by the original, unmodified LOAD 1 operation.

Figure 9:
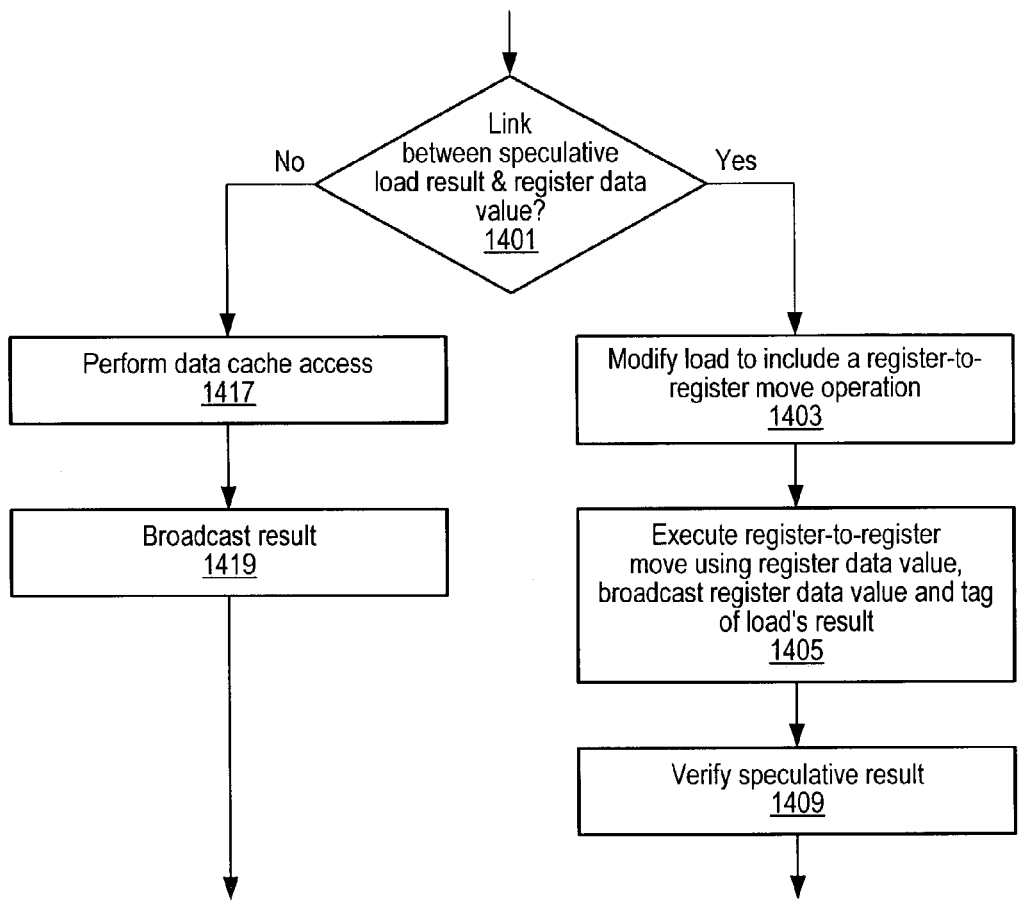
FIG. 9 is a flowchart showing another method of issuing operations with speculative data values and recovering from mispredictions.

FIG. 9 illustrates one embodiment of a method of converting load operations to include a speculative register-to-register move operation. As shown, if a link between a register data value identified by a particular tag and a speculative result of a load operation is detected (e.g., by a stack file or a memory file) at 1401, the load operation may be modified to include a register-to-register move operation having a source operand tag equal to the tag of the data value linked to the speculative load result, as shown at 1403. Execution of the register-to-register move operation may involve outputting the data value identified by the tag onto the result bus along with the tag of the load's result at 1405.

The speculative result may be verified (e.g., by performing the address calculation for the original load) at 1409. If the speculative result is correct, the load's result may not be rebroadcast on the result bus (or, alternatively, the load's result may be rebroadcast along with an indication that dependent operations should not reissue in response to the rebroadcast result). If the speculative result is incorrect, the data cache may be accessed to retrieve the correct load result and the correct load result may be broadcast on the result bus. This may in turn cause any dependent operations that issued using the speculative result value to be reissued. Note that in some situations, the speculative result may be verified before performance of the register-to-register move operation. If the speculative result is incorrect, the register-to-register move operation may not be performed.

If no link between the speculative result of the load operation and a register data value is detected (e.g., the load's addressing pattern misses in a stack file), the load may not be modified. The load may execute normally, accessing the data cache and broadcasting its result on the result bus, as shown at 1417 and 1419.

Trace Cache

Figure 1A:
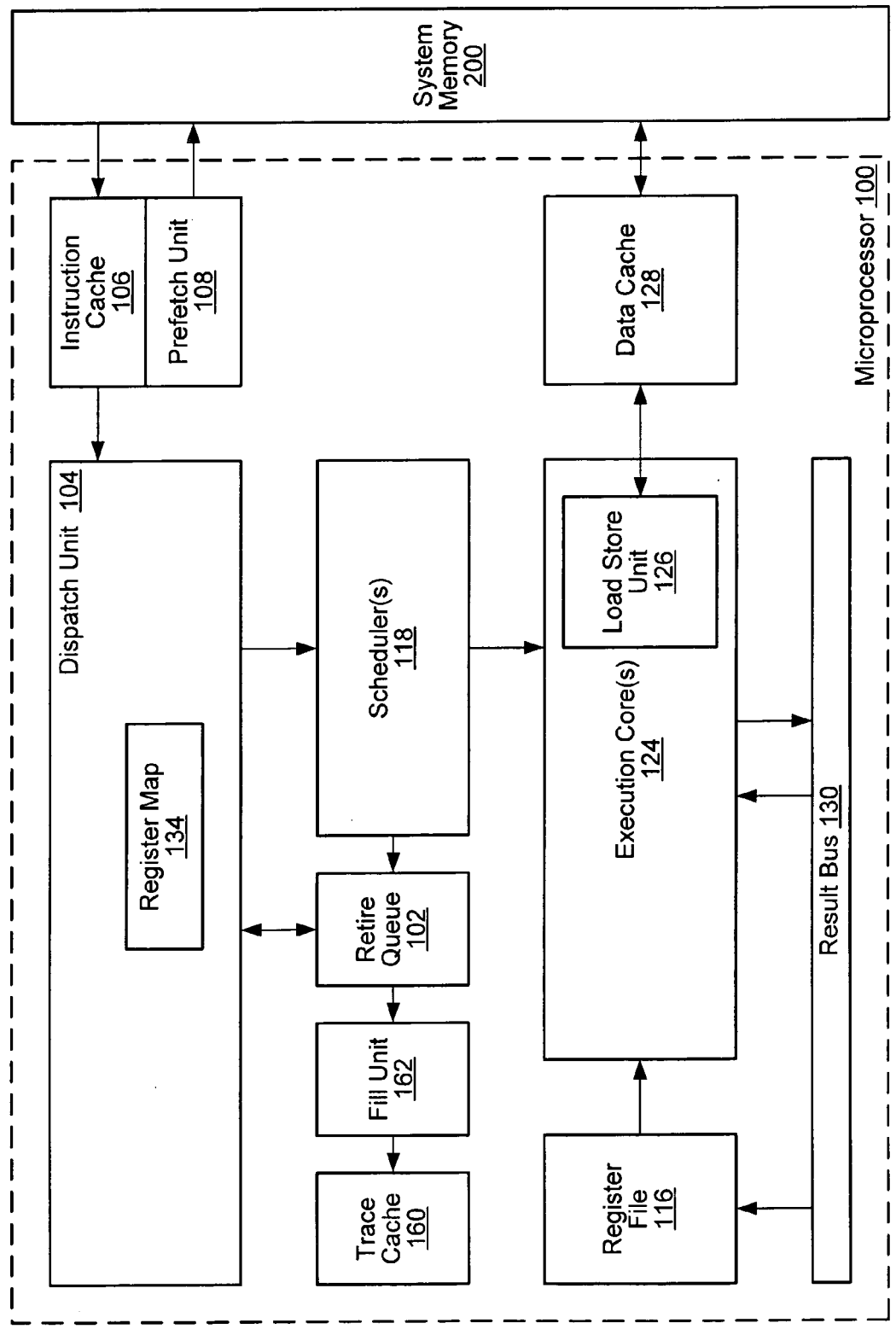
FIG. 1A illustrates a block diagram of microprocessor, according to another embodiment.

FIG. 1A shows a microprocessor according to one embodiment. In this embodiment, the microprocessor includes a trace cache 160 that is configured to cache traces of instructions and/or at least partially decoded operations. In the illustrated embodiment, the trace cache 160 is located at the back end of the microprocessor such that traces are created by trace fill unit 162 as operations are retired. If the operations within a trace are fetched again, the operations may be fetched from trace cache 160 instead of from instruction cache 106 or system memory 200. Note that in other embodiments, trace fill unit 162 may be included at the front end (e.g., before the dispatch unit 104) of the microprocessor.

Figure 10:
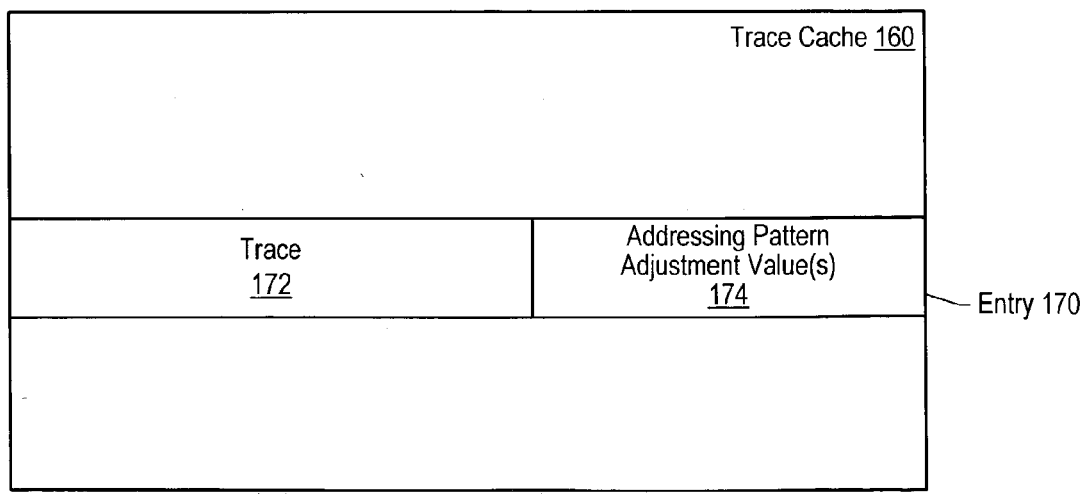
FIG. 10 illustrates a block diagram of a trace cache, according to one embodiment.

FIG. 10 illustrates one embodiment of a trace cache 160. As shown, the trace cache 160 may include one or more trace cache entries 170. Each trace cache entry 170 stores a trace 172 of instructions or operations. A trace 172 may include several instructions or operations from more than one basic block. Some operations within a particular trace may depend on one or more branch operations included in the trace while other operations within the same trace may not depend on those branch operations. Traces 172 may also include flow control information identifying whether the operations included in each trace depend on one or more branch operations included in that trace, whether the branch operations were taken at the time the trace was created, and a label identifying an operation or instruction to which control should transfer if the branch operation resolves differently the next time the branch operation is executed in some embodiments.

Each trace may include operations that have been optimized. Optimizations may include those that reduce the size and/or number of operations within a trace so that the operations in that trace take up less room within a trace cache entry 170 and/or scheduler 118. Optimizations may also cause one or more operations within a trace to become issueable earlier (e.g., by reducing data dependencies between operations in the same trace), etc.

Each trace cache entry 170 may include information 174 indicating the change(s), if any, to the stack pointer (e.g., ESP) due to execution of the instructions and/or operations within that trace 172. When handling the operations included in the trace, the stack file controller 202 (or memory file controller 402, if the memory file 136 implements stack file functionality) may use this information to update the stack pointer addressing adjustment value, to adjust the addressing patterns of the operations input to the stack file, and/or to adjust the addressing patterns of entries within the stack file storage. For example, a trace cache entry 170 that includes three operations that each add four to the value of the stack pointer may indicate that the stack and/or memory file controller should add 12 to the stack pointer addressing pattern adjustment value when those three operations are dispatched. If another operation sets the stack frame pointer equal to the stack pointer, the trace cache entry 170 may include information indicating that the stack and/or memory file controller should set the offset value equal to zero (or set the stack frame pointer addressing pattern adjustment value equal to the stack pointer addressing pattern adjustment value) when that operation is dispatched.

Including information 174 in each trace cache entry 170 indicating changes to the stack pointer and/or the stack frame pointer may allow the stack and/or memory file to remain accurate even after dispatch of several traces. Without such information, optimizations made to operations within a trace may result in corruption within the stack and/or memory file after the stack and/or memory file handles those optimized operations. For example, a sequence of instructions may include:

PUSH <>
  MOV EBP, ESP
  PUSH <>

Those instructions may be decoded into the following sequence of operations:

MOV [ESP-4], <>
  ADD ESP, ESP, -4
  MOV EBP, ESP
  ADD ESP, ESP, -4
  MOV [ESP], <>

Note that almost all of the above operations depend on a data value produced by a prior operation. Accordingly, there are many opportunities for those operations to stall in the scheduler while waiting for the result of a prior operation to become available. When the trace fill unit 162 handles the sequence of operations for storage as part of a trace 172 within a trace cache entry 170, the trace fill unit 162 may perform certain transformations in order to reduce the data dependencies between operations. For example, the above operation sequence may be optimized to:

MOV [ESP-4], <>
  ADD o1, ESP, -4
  MOV EBP, o1
  MOV [ESP-8], <>
  ADD ESP, ESP, -8

Additionally, information 174 indicating a total ESP offset of −8 within the trace and an ESP-EBP offset of +4 may be included in the trace cache entry 170. The trace fill unit 162 may update this information one operation at a time as it handles each original operation and store the final value in the trace cache entry 170 that includes the trace 172 of optimized operations.

Due to the transformations performed on the operations, each of the optimized operations in the above example now only depends on the value of ESP. Accordingly, all of the operations in the trace may become issuable as soon as the value of ESP is available. However, certain optimizations, such as the one that "slotified" ESP in the ADD operation to the temporary register o1 obscure information that would otherwise be used by the stack and/or memory file controller to maintain the accuracy of the stack and/or memory file. In this example, the slotification transformation hides the fact that the MOV EBP, o1 operation is actually assigning the current value of the stack pointer to EBP from the stack and/or memory file controller, which may be configured to detect such an assignment by simply comparing register logical identifiers. The information 174 included in the trace cache entry 170 indicating that, due to execution of operations within the trace 172, the ESP-EBP offset equals +4 may be used by the stack and/or memory file controller to appropriately adjust the addressing pattern adjustment values, addressing patterns, and/or offset values in response to handling the operations in the trace.

Thus, in some embodiments, optimizations such as the slotification transformation above may cause some operations to be stored within a trace cache entry 170 in a format that will not be recognized in the stack and/or memory file, even though the unoptimized versions of those operations would have been recognized by the stack and/or memory file, either by hitting in the stack and/or memory file or by causing an update to one or more addressing patterns, addressing pattern adjustment values, and/or offset values. Despite the obfuscation of these operations, however, the stack and/or memory file may remain accurate due to the inclusion of information 174 within each trace cache entry 170.

If operations from more than one basic block are included within a trace, that trace may include information 174 for each set of operations within the same basic block. The stack and/or memory file controller may use each set of information 174 dependent on whether the basic block with which each adjustment is associated is dispatched and/or predicted to be (or actually) executed. For example, a trace may include operations from two different basic blocks and a set of information 174 for each group of operations. Execution of the second set of operations may be conditioned on a branch included in the first set of operations being taken. If that branch is predicted not taken when the trace is dispatched, the stack and/or memory file controller may use the information 174 associated with the first set of operations to make adjustments. However, the stack and/or memory file controller may ignore the information 174 associated with the other set of operations, since the branch prediction indicates that those operations will not be executed.

Exemplary Computer Systems

Figure 11:
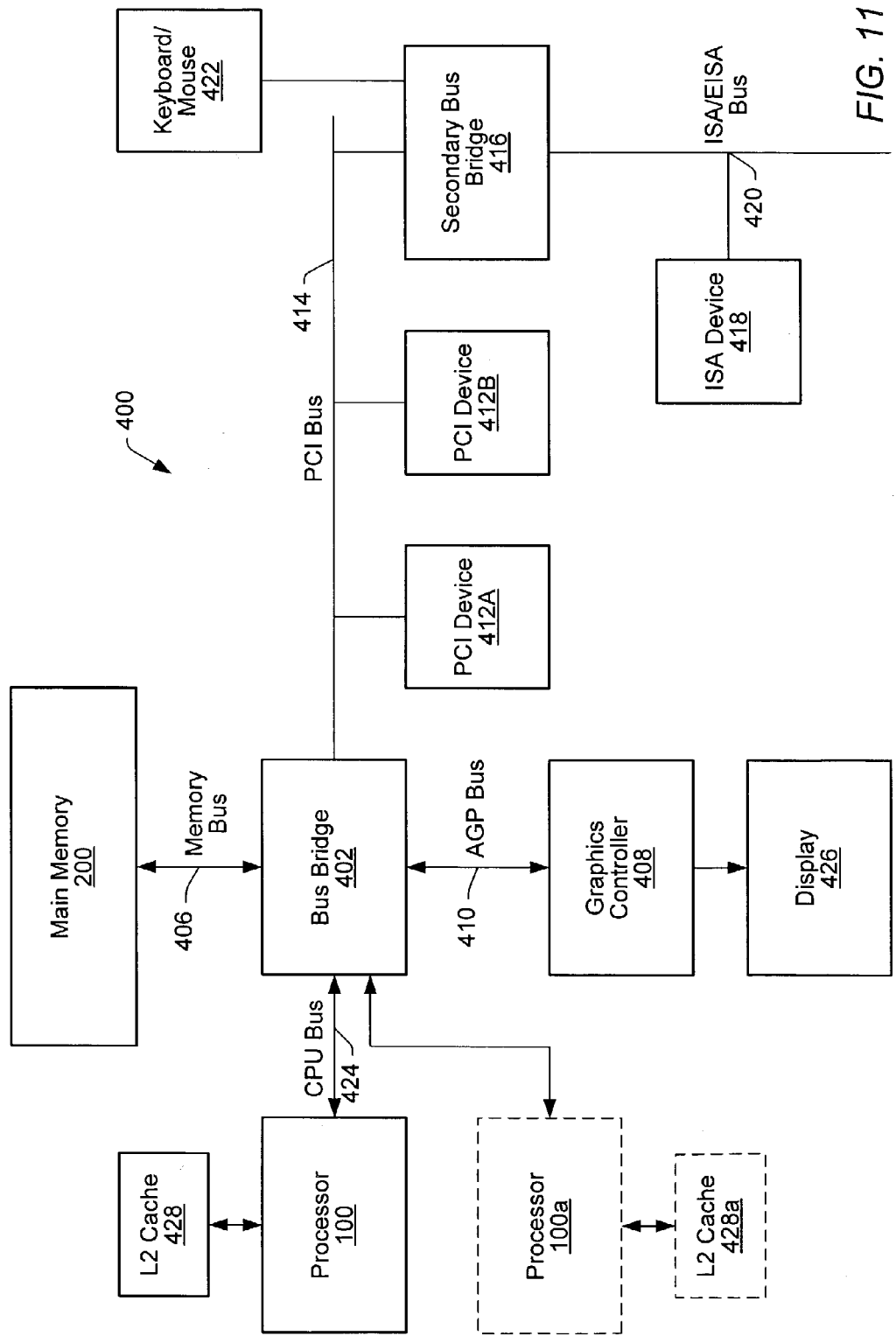
FIG. 11 shows a computer system, according to one embodiment.

FIG. 11 shows a block diagram of one embodiment of a computer system 400 that includes a processor 100 coupled to a variety of system components through a bus bridge 402. Processor 100 may include an embodiment of a dispatch unit 104, a stack file 132, a scheduler 118, and/or speculative register map 800 as described above. Other embodiments of a computer system are possible and contemplated. In the depicted system, a main memory 200 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, processor 100 is coupled to bus bridge 402 through a CPU bus 424 and to an optional L2 cache 428. In some embodiments, the processor 100 may include an integrated L1 cache (not shown).

Bus bridge 402 provides an interface between processor 100, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between processor 100 and bus bridge 402 in other embodiments. Alternatively, the external cache may be coupled to bus bridge 402 and cache control logic for the external cache may be integrated into bus bridge 402. L2 cache 428 is shown in a backside configuration to processor 100. It is noted that L2 cache 428 may be separate from processor 100, integrated into a cartridge (e.g., slot 1 or slot A) with processor 100, or even integrated onto a semiconductor substrate with processor 100.

Main memory 200 is a memory in which application programs are stored and from which processor 100 primarily executes. A suitable main memory 200 comprises DRAM (Dynamic Random Access Memory). For example, a plurality of banks of SDRAM (Synchronous DRAM) or Rambus DRAM (RDRAM) may be suitable.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 200. Graphics controller 408 may therefore be a master of AGP bus 410 in that it can request and receive access to a target interface within bus bridge 402 to thereby obtain access to main memory 200. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional processors (e.g., processor 100a shown as an optional component of computer system 400). Processor 100a may be similar to processor 100. More particularly, processor 100a may be an identical copy of processor 100. Processor 100a may be connected to bus bridge 402 via an independent bus (as shown in FIG. 11) or may share CPU bus 224 with processor 100. Furthermore, processor 100a may be coupled to an optional L2 cache 428a similar to L2 cache 428.

Figure 12:
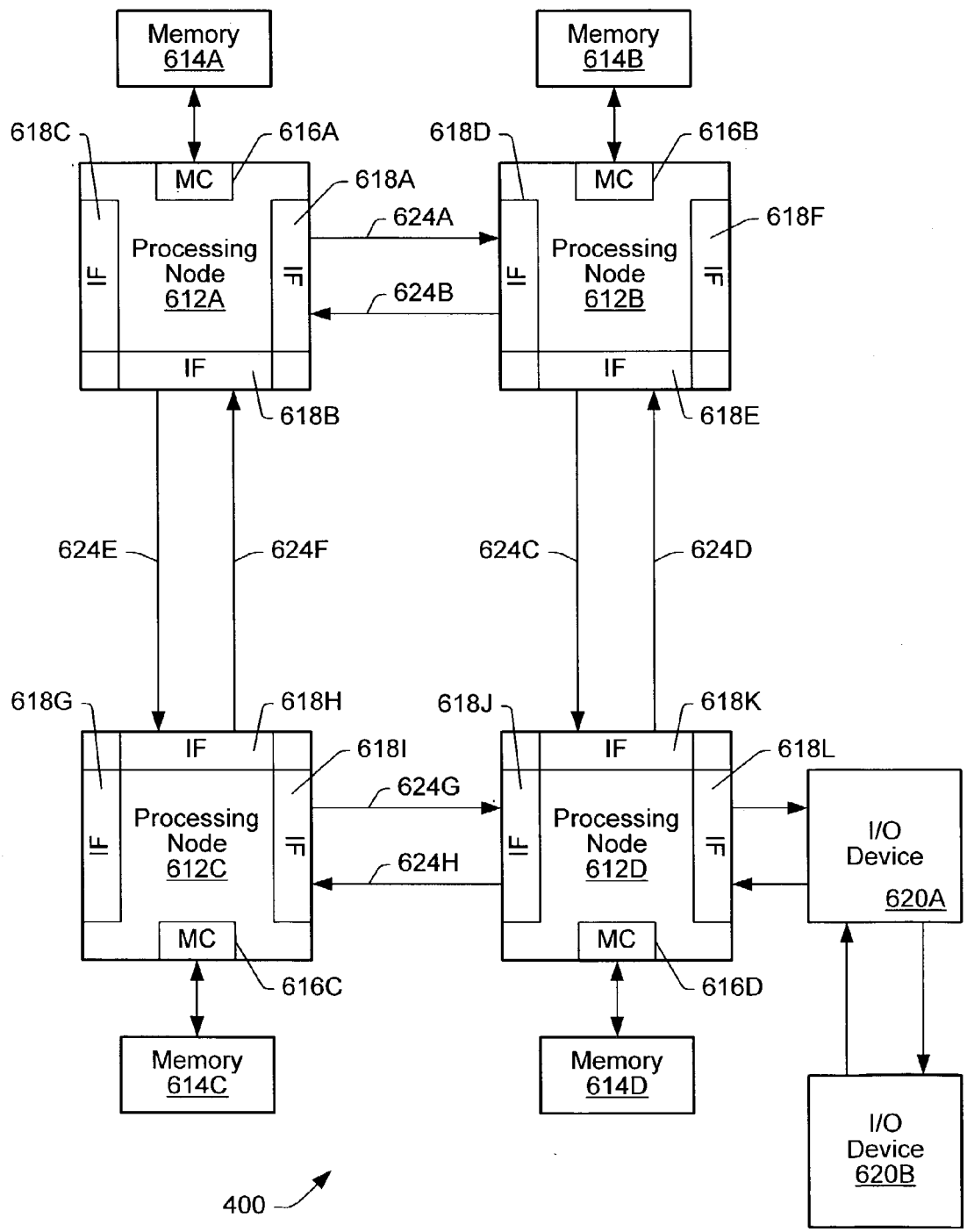
FIG. 12 shows a computer system, according to another embodiment.

Turning now to FIG. 12, another embodiment of a computer system 400 that may include a dispatch unit 104, a stack file 132, a scheduler 118, and/or speculative register map 800 as described above is shown. Other embodiments are possible and contemplated. In the embodiment of FIG. 12, computer system 400 includes several processing nodes 612A, 612B, 612C, and 612D. Each processing node is coupled to a respective memory 614A–614D via a memory controller 616A–616D included within each respective processing node 612A–612D. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A–620B in a daisy chain configuration) via interface logic 618L. Other processing nodes may communicate with other I/O devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes as illustrated in FIG. 12. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 12. Any suitable routing algorithm may be used. Other embodiments of computer system 400 may include more or fewer processing nodes then the embodiment shown in FIG. 12.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D may include one or more processors in addition to a memory controller and interface logic. Broadly speaking, a processing node comprises at least one processor and may optionally include a memory controller for communicating with a memory and other logic as desired. More particularly, each processing node 612A–612D may include one or more copies of processor 100. External interface unit 18 may includes the interface logic 618 within the node, as well as the memory controller 616.

Memories 614A–614D may comprise any suitable memory devices. For example, a memory 614A–614D may comprise one or more RAMBUS DRAMs (RDRAMs), synchronous DRAMs (SDRAMs), static RAM, etc. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may comprise control circuitry for interfacing to memories 614A–614D. Additionally, memory controllers 616A–616D may include request queues for queuing memory requests.

Interface logic 618A–618L may comprise a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicate with another computer system to which the devices may be coupled (e.g., network interface cards or modems). Furthermore, I/O devices 620A–620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. A system, comprising:
   a memory file including an entry configured to store an addressing pattern and a tag, wherein if an addressing pattern of a memory operation matches the addressing pattern stored in the entry, the memory file is configured to link a data value identified by the tag to a speculative result of the memory operation,
   wherein the addressing pattern of the memory operation includes an identifier of a logical register, and wherein the memory file is configured to predict whether the logical register is being specified as a general purpose register or a stack frame pointer register in order to determine whether the addressing pattern of the memory operation matches the addressing pattern stored in the entry, and
   an execution core coupled to the memory file, wherein the execution core is configured to access the speculative result when executing an other operation that is dependent on the memory operation.

2. The system of claim 1, wherein if the memory file predicts that the logical register included in the addressing pattern of the memory operation is being used as the stack frame pointer register, the memory file is configured to determine that the addressing pattern of the memory operation does not match the addressing pattern stored in the entry; and
   if the memory file predicts that the logical register is being used as the general purpose register, the memory file is configured to determine that the addressing pattern of the memory operation matches the addressing pattern stored in the entry if the addressing pattern of the memory operation equals the addressing pattern stored in the entry.

3. The system of claim 2, wherein the memory file is further configured to not allocate a new entry to store the addressing pattern of the memory operation if the memory file predicts that the logical register included in the addressing pattern of the memory operation is being used as the stack frame pointer register; and
   if the memory file predicts that the logical register is being used as the general purpose register, the memory file is configured to allocate the new entry to store the addressing pattern of the memory operation if the addressing pattern of the memory operation does not equal the addressing pattern stored in the entry.

4. The system of claim 1, wherein the memory file comprises a plurality of entries, and wherein the memory file is configured to determine that the addressing pattern of the memory operation does not match any of a plurality of addressing patterns stored in the plurality of entries if the memory file predicts that the logical register is being used as the stack file pointer register.

5. The system of claim 4, wherein the memory file comprises a plurality of entries, and wherein the memory file is configured to not allocate one of the plurality of entries to store the addressing pattern of the memory operation if the memory file predicts that the logical register is being used as the stack file pointer register.

6. The system of claim 1, wherein the memory file is configured to predict that the logical register is being used as the stack frame pointer in response to detection of a call instruction.

7. The system of claim 1, wherein the memory file is configured to predict that the logical register is being used as the general purpose register in response to detection of a return instruction.

8. The system of claim 1, wherein the memory file is configured to predict that the logical register is being used as the stack frame pointer in response to detection of a operation that copies a value of the stack pointer into the logical register.

9. The system of claim 1, wherein the memory file is configured to predict that the logical register is being used as the stack frame pointer in response to detection of a enter instruction.

10. The system of claim 1, wherein the memory file is configured to predict how the logical register is being used by tracking a current call depth, wherein the memory file is configured to increase the current call depth in response to detecting a call instruction and to decrease the current call depth in response to detecting a return instruction.

11. The system of claim 10, wherein the entry stores a call depth value equal to a value of the current call depth when the entry was allocated.

12. The system of claim 11, wherein if a value of the current call depth when the memory operation is handled is not equal to the call depth value stored in the entry, the memory file is configured to determine that the addressing pattern of the memory operation does not match the addressing pattern stored in the entry; and if the value of the current call depth when the memory operation is handled is equal to the call depth value stored in the entry, the memory file is configured to determine that the addressing pattern of the memory operation matches the addressing pattern stored in the entry if the addressing pattern of the memory operation equals the addressing pattern stored in the entry.

13. The system of claim 11, wherein if the value of the current call depth when the memory operation is handled is not equal to the call depth value stored in the entry, the memory file is configured to allocate a new entry to store the addressing pattern of the memory operation and to store the value of the current call depth when the memory operation is handled in the new entry.

14. The system of claim 11, wherein if the addressing pattern stored in the entry includes the identifier of the logical register, the memory file is configured to invalidate the entry in response to dispatch of an operation that, when executed, modifies a value of the logical register if a value of the current call depth when the operation is handled is equal to the call depth value stored in the entry; and wherein the memory file is configured to not invalidate the entry in response to dispatch of the operation if the value of the current call depth when the operation is handled is not equal to the call depth value stored in the entry.

15. The system of claim 1, wherein the memory file includes an other entry, wherein the other entry stores a stack-relative addressing pattern, wherein the memory file includes a mechanism for adjustments to a stack pointer, and wherein the memory file is configured to use the mechanism to compensate for adjustments to the stack pointer when determining whether an addressing pattern of an operation matches the stack-relative addressing pattern stored in the other entry.

16. The system of claim 15, wherein the memory file is configured to compensate for adjustments to the stack pointer by modifying a displacement stored in the other entry in response to dispatch of an operation that, when executed, modifies the value of the stack pointer.

17. The system of claim 15, wherein the memory file is configured to compensate for adjustments to the stack pointer by modifying an addressing pattern adjustment value, wherein the memory file is configured to apply the addressing pattern adjustment value to an addressing pattern of a new operation prior to comparing the addressing pattern of the new operation to the stack-relative addressing pattern stored in the other entry in order to determine whether the addressing pattern of the new operation matches the stack-relative addressing pattern stored in the other entry.

18. The system of claim 17, wherein the memory file is configured to allocate a new entry to store the addressing pattern of the new operation if the addressing pattern of the new operation does not match the stack-relative addressing pattern stored in the other entry, wherein the addressing pattern adjustment value is applied to the addressing pattern of the new operation stored in the memory file entry.

19. The system of claim 1, wherein the memory file is configured to modify a stack frame pointer addressing pattern adjustment value in response to dispatch of an operation that, when executed, modifies a value of the stack frame pointer; and wherein the memory file is configured to apply the stack frame pointer addressing pattern adjustment value to the addressing pattern of the memory operation prior to comparing the addressing pattern of the memory operation to the addressing pattern stored in the entry in order to determine whether the addressing pattern of the memory operation matches the addressing pattern stored in the entry.

20. The system of claim 1, further comprising a stack file comprising a plurality of entries, wherein if an addressing pattern of an operation does not match an addressing pattern stored in one of the plurality of entries, the stack file is configured to allocate an entry to store the addressing pattern of the operation if the addressing pattern of the operation includes the identifier of the logical register.

21. The system of claim 20, wherein the memory file comprises a plurality of entries, and wherein if the addressing pattern of the operation does not match an addressing pattern stored in one of the plurality of entries in the memory file, the memory file is configured to allocate an entry to store the addressing pattern of the operation if the addressing pattern of the operation includes the identifier of the logical register.

22. The system of claim 20, wherein the memory file comprises a plurality of entries, wherein the memory file is configured to selectively allocate an entry in the memory file to store the addressing pattern of the operation dependent on predicting whether the logical register is being specified as a general purpose register or a stack frame pointer register.

23. The system of claim 20, wherein the memory file is configured to not allocate an entry in the memory file to any operation whose addressing pattern includes an identifier of a stack pointer register.

24. The system of claim 20, wherein the stack file is configured to maintain a stack pointer addressing pattern adjustment value and a stack frame pointer addressing pointer adjustment value; and wherein the memory file is configured to predict whether the logical register is being specified as a general purpose register or a stack frame pointer register dependent on whether the stack frame pointer addressing pointer adjustment value is valid.

25. The system of claim 1, further comprising means for forwarding the tag as a speculative operand source tag for the memory operation.

26. The system of claim 25, further comprising a scheduler configured to issue the memory operation in response to the speculative source operand tag being provided to the scheduler.

27. The system of claim 1, further comprising means for forwarding the data value on a result bus and for indicating that the data value is the result of the memory operation.

28. The system of claim 1, wherein the addressing pattern stored in the entry is a portion of an addressing pattern of a store operation, wherein the store operation occurs earlier in program order than the memory operation.

29. A method comprising:

predicting whether a logical register identified in an addressing pattern of a memory operation is being used as a general purpose register or as a stack frame pointer register;

dependent on said predicting, determining whether the addressing pattern of the memory operation matches an addressing pattern of an earlier operation;

if the addressing pattern of the memory operation matches an addressing pattern of an earlier operation, linking a data value identified by a tag of an operand for the earlier operation to a speculative result of the memory operation; and executing an operation having an operand source dependent on a result of the memory operation, wherein said executing comprises accessing the data value identified by the tag.

30. The method of claim 29, wherein if said predicting predicts that the logical register included in the addressing pattern of the memory operation is being used as the stack frame pointer register, said determining comprises determining that the addressing pattern of the memory operation does not match the addressing pattern of the earlier operation; and wherein if said predicting predicts that the logical register is being used as the general purpose register, said determining comprises determining that the addressing pattern of the memory operation matches the addressing pattern of the earlier operation if the addressing pattern of the memory operation equals the addressing pattern of the earlier operation.

31. The method of claim 30, further comprising not storing the addressing pattern of the memory operation in a memory file if said predicting predicts that the logical register included in the addressing pattern of the memory operation is being used as the stack frame pointer register; and if said predicting predicts that the logical register is being used as the general purpose register, storing the addressing pattern of the memory operation in the memory file if the addressing pattern of the memory operation does not equal the addressing pattern of the earlier operation.

32. The method of claim 29, wherein said predicting comprises predicting that the logical register is being used as the stack frame pointer in response to detection of a call instruction.

33. The method of claim 32, wherein said predicting comprises predicting that the logical register is being used as the general purpose register in response to detection of a return instruction.

34. The method of claim 29, wherein said predicting comprises predicting that the logical register is being used as the stack frame pointer in response to detection of an enter instruction.

35. The method of claim 29, wherein said predicting comprises predicting that the logical register is being used as the stack frame pointer in response to detection of an operation that operates to copy a value of a stack pointer to the logical register.

36. The method of claim 29, wherein said predicting comprises tracking a current call depth by increasing the current call depth in response to detecting a call instruction and decreasing the current call depth in response to detecting a return instruction.

37. The method of claim 36, wherein the addressing pattern of the earlier operation is stored in a memory file entry, and wherein the memory file entry includes a call depth value equal to a value of the current call depth when the memory file entry was allocated.

38. The method of claim 36, wherein said determining comprises determining that the addressing pattern of the memory operation does not match the addressing pattern of the earlier operation if a value of the current call depth when the memory operation is handled is not equal to the call depth value stored in the memory file entry; and if the value of the current call depth when the memory operation is handled is equal to the call depth value stored in the memory file entry, said determining comprises determining that the addressing pattern of the memory operation matches the addressing pattern of the earlier operation if the addressing pattern of the memory operation equals the addressing pattern stored in the memory file entry.

39. The method of claim 36, further comprising allocating another memory file entry to store the addressing pattern of the memory operation and the value of the current call depth if the value of the current call depth when the memory operation is handled is not equal to the call depth value stored in the memory file entry.

40. The method of claim 29, wherein the addressing pattern of the earlier operation is stored in an entry in a memory file, and wherein a stack-relative addressing pattern is stored in an other entry in the memory file;

the method further comprising determining whether an addressing pattern of an operation matches the stack-relative addressing pattern by tracking modifications to a stack pointer.

41. The method of claim 40, wherein said tracking modifications to the stack pointer comprises modifying a displacement stored in the other entry in response to dispatch of an operation that, when executed, modifies the value of the stack pointer.

42. The method of claim 40, wherein said tracking modifications to the stack pointer comprises modifying an addressing pattern adjustment value, wherein said determining comprises applying the addressing pattern adjustment value to the addressing pattern of the operation prior to comparing the addressing pattern of the operation to the stack-relative addressing pattern stored in the other entry.

43. The method of claim 29, further comprising modifying a stack frame pointer addressing pattern adjustment value in response to dispatch of an operation that, when executed, modifies a value of the stack frame pointer; and applying the stack frame pointer addressing pattern adjustment value to the addressing pattern of the memory operation prior to comparing the addressing pattern of the memory operation to the addressing pattern of the earlier operation in order to determine whether the addressing pattern of the memory operation matches the addressing pattern of the earlier operation.

44. The method of claim 43, further comprising allocating a memory file entry to store the addressing pattern of the memory operation if the addressing pattern of the memory operation does not match the addressing pattern of the earlier operation, wherein the stack frame pointer addressing pattern adjustment value modifies the addressing pattern of the memory operation stored in the memory file entry.

45. The method of claim 29, further comprising a stack file allocating an entry to store an addressing pattern of an operation if the addressing pattern of the operation does not match an addressing pattern stored in one of a plurality of entries included in the stack file and if the addressing pattern of the operation includes the identifier of the logical register.

46. The method of claim 45, further comprising a memory file selectively allocating an entry in the memory file to store the addressing pattern of the operation dependent on said predicting.

47. The method of claim 45, further comprising the stack file maintaining a stack pointer addressing pattern adjustment value and a stack frame pointer addressing pointer adjustment value, wherein said predicting depends on whether the stack frame pointer addressing pointer adjustment value is valid.

48. A computer system comprising:

a system memory; and a microprocessor coupled to the system memory, the microprocessor including:

a memory file including an entry configured to store an addressing pattern and a tag, wherein if an addressing pattern of a memory operation matches the addressing pattern stored in the entry, the memory file is configured to link a data value identified by the tag to a speculative result of the memory operation, wherein an addressing pattern of the memory operation includes an identifier of a logical register, and wherein the memory file is configured to predict whether the logical register is being specified as a general purpose register or a stack frame pointer register in order to determine whether the addressing pattern of the memory operation matches the addressing pattern stored in the entry, and an execution core coupled to the memory file, wherein the execution core is configured to access the speculative result when executing an other operation that is dependent on the memory operation.

* * * * *